(12) United States Patent
Martinez et al.

(10) Patent No.: US 7,557,147 B2
(45) Date of Patent: *Jul. 7, 2009

(54) SOFT FOAMS MADE FROM INTERPOLYMERS OF ETHYLENE/ALPHA-OLEFINS

(75) Inventors: Felipe Martinez, Houston, TX (US); Yunwa W. Cheung, Lake Jackson, TX (US); Suresh Subramonian, Midland, MI (US); Bridgette L. Gomillion-Williams, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 205 days.

This patent is subject to a terminal disclaimer.

(21) Appl. No.: 11/376,787

(22) Filed: Mar. 15, 2006

(65) Prior Publication Data

US 2006/0205833 A1  Sep. 14, 2006

Related U.S. Application Data

(63) Continuation-in-part of application No. PCT/US2005/008917, filed on Mar. 17, 2005.

(60) Provisional application No. 60/717,893, filed on Sep. 16, 2005, provisional application No. 60/553,906, filed on Mar. 17, 2004.

(51) Int. Cl.
   C08J 9/00 (2006.01)
   B29C 44/34 (2006.01)
   C08F 110/00 (2006.01)
   C08F 210/00 (2006.01)
   C08G 85/00 (2006.01)

(52) U.S. Cl. .................. 521/144; 521/50; 521/142; 521/143; 526/72

(58) Field of Classification Search ............... 521/139, 521/50, 144; 526/72
   See application file for complete search history.

(56) References Cited

U.S. PATENT DOCUMENTS

| | | | |
|---|---|---|---|
| 3,873,642 A | 3/1975 | Jezl | |
| 4,798,081 A * | 1/1989 | Hazlitt et al. | 73/53.01 |
| 5,208,265 A | 5/1993 | De Grave et al. | |
| 5,468,810 A | 11/1995 | Hayakawa et al. | |
| 5,594,080 A | 1/1997 | Waymouth et al. | |
| 5,610,253 A | 3/1997 | Hatke et al. | |
| 5,733,980 A | 3/1998 | Cozewith et al. | |

(Continued)

FOREIGN PATENT DOCUMENTS

EP 0 274 906 A2 7/1988

(Continued)

OTHER PUBLICATIONS

International Search Report and attached Written Opinion of the International Searching Authority mailed Aug. 9, 2006.

(Continued)

*Primary Examiner*—James Seidleck
*Assistant Examiner*—Melissa Winkler

(57) ABSTRACT

Foamable compositions and soft foams comprise at least an ethylene/α-olefin interpolymer. The soft foam has a density from about 10 to 150 kg/m³. The foamable compositions further comprise a blowing agent. The ethylene/α-olefin interpolymers are a multi-block copolymer comprising at least one soft block and at least one hard block. Methods of making the foamable compositions and soft foams; and foam articles made from the soft foams are also described.

38 Claims, 27 Drawing Sheets

U.S. PATENT DOCUMENTS

| | | | |
|---|---|---|---|
| 5,798,420 A | 8/1998 | Cozewith et al. | |
| 5,969,070 A | 10/1999 | Waymouth et al. | |
| 6,008,262 A | 12/1999 | McKay et al. | |
| 6,114,457 A | 9/2000 | Markel et al. | |
| 6,147,180 A | 11/2000 | Markel et al. | |
| 6,160,029 A * | 12/2000 | Chaudhary et al. | 521/139 |
| 6,262,203 B1 | 7/2001 | Chien et al. | |
| 6,455,638 B2 * | 9/2002 | Laughner et al. | 525/191 |
| 6,566,544 B1 | 5/2003 | Waymouth et al. | |
| 6,841,582 B2 | 1/2005 | Morikawa et al. | |
| 2003/0013778 A1 | 1/2003 | Sueda et al. | |
| 2003/0027954 A1* | 2/2003 | Becke et al. | 526/126 |
| 2004/0121922 A1 | 6/2004 | Okada et al. | |
| 2004/0249009 A1 | 12/2004 | Homma et al. | |
| 2006/0046622 A1 | 3/2006 | Prasad | |

FOREIGN PATENT DOCUMENTS

| | | |
|---|---|---|
| EP | 0 958 313 B1 | 9/2002 |
| EP | 1 262 498 A2 | 12/2002 |
| JP | 2002-206007 A | 7/2002 |
| JP | 2004-204058 A | 7/2004 |
| WO | WO 95/27745 A1 | 10/1995 |
| WO | WO 95/27746 A1 | 10/1995 |
| WO | WO 98/34970 A1 | 8/1998 |
| WO | WO 99/35171 A1 | 7/1999 |
| WO | WO 00/37514 A1 | 6/2000 |
| WO | WO 02/066540 A2 | 8/2002 |
| WO | WO 03/014046 A1 | 2/2003 |
| WO | WO 2005/090425 A | 9/2005 |
| WO | WO 2005/090426 A | 9/2005 |
| WO | WO 2005/090427 A | 9/2005 |
| WO | WO 2005/111125 A | 11/2005 |

OTHER PUBLICATIONS

International Search Report and attached Written Opinion of the International Searching Authority mailed Aug. 16, 2006.

* cited by examiner

US 7,557,147 B2

SOFT FOAMS MADE FROM INTERPOLYMERS OF ETHYLENE/ALPHA-OLEFINS

CROSS-REFERENCE TO RELATED APPLICATIONS

This application claims priority to U.S. Provisional Application No. 60/717,893, filed Sep. 16, 2005, which further claims priority to PCT Application No. PCT/US2005/008917, filed on Mar. 17, 2005, which in turn claims priority to U.S. Provisional Application No. 60/553,906, filed Mar. 17, 2004. For purposes of United States patent practice, the contents of the provisional applications and the PCT application are herein incorporated by reference in their entirety.

FIELD OF THE INVENTION

This invention relates to soft foams comprising at least one ethylene/α-olefin interpolymer, and the methods of making and using the soft foams in various applications, for example, acoustical insulation, vibration control, cushioning, specialty packaging, automotive soft touch, thermal insulation and impact absorption.

BACKGROUND OF THE INVENTION

Polyolefins such as low density polyethylene (LDPE) and polypropylene (PP) are commonly used in many non-crosslinked foam applications. For example, U.S. Pat. No. 6,583,193 discloses an extruded, coalesced polypropylene foam that is either open-celled which is useful for sound insulation applications or close celled which is useful for thermal insulation applications. LDPE or PP can also be blended with a softer component such as copolymer of ethylene and vinyl acetate (EVA), ethylene-ethyl acrylate copolymer (EEA), ethylene-acrylic acid copolymer (EAA) and other ethylene copolymers having a low melting point to make soft foams for a variety of applications. For example, U.S. Pat. No. 6,590,006 discloses macrocellular foams comprising a blend of a high-melt-strength (HMS) polypropylene and an ethylene copolymer such as EVA, EEA, and EAA for use in sound absorption and insulation applications.

Although there are many useful polymers and polymer blends for soft foam applications, there are always needs for improved soft foams because of the continuous demands of product improvements by the consumers and foam manufacturers.

SUMMARY OF THE INVENTION

The aforementioned needs can be met by various aspects of the invention. In one aspect, the invention relates to a soft foam comprising at least one ethylene/α-olefin interpolymer wherein the density of the foam is from about 10 to 150 kg/m³. In one embodiment, the ethylene/α-olefin interpolymer has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$$T_m \geq -2002.9 + 4538.5(d) - 2422.2(d)^2.$$

In another embodiment, the ethylene/α-olefin interpolymer has a $M_w/M_n$ from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.

In another embodiment, the ethylene/α-olefin interpolymer is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d).$$

In another embodiment, the ethylene/α-olefin interpolymer has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer.

In another embodiment, the ethylene/α-olefin interpolymer is characterized by a storage modulus at 25° C., G'(25° C.), and a storage modulus at 100° C., G'(100° C.), wherein the ratio of G'(25° C.) to G'(100° C.) is from about 1:1 to about 10:1.

In another embodiment, the ethylene/α-olefin interpolymer has at least one molecular fraction which elutes between 40° C. and 130° C. when fractionated using TREF, characterized in that the fraction has a block index of at least 0.5 and up to about 1 and a molecular weight distribution, $M_w/M_n$, greater than about 1.3. In another embodiment, the ethylene/α-olefin interpolymer has an average block index greater than zero and up to about 1.0 and a molecular weight distribution, $M_w/M_n$, greater than about 1.3.

In another embodiment, the α-olefin in the ethylene/α-olefin interpolymer is styrene, propylene, 1-butene, 1-hexene, 1-octene, 4-methyl-1-pentene, norbornene, 1-decene, 1,5-hexadiene, or a combination thereof.

In another embodiment, the soft foam disclosed herein is not cross-linked and/or contains less than 5% of gel per ASTM D-2765-84 Method A. In another embodiment, the soft foam further comprising a polyolefin, which in some instances is a low density polyethylene, a high-melt-strength polypropylene or a combination thereof. In another embodiment, the ratio of the polyolefin to the ethylene/α-olefin interpolymer is from about 1:10 to about 10:1 by weight.

In another embodiment, the soft foam disclosed herein further comprises at least an additive which, in some instances, is a grafting initiator, cross-linking catalyst, blowing agent activator, coagent, plasticizer, colorant or pigment, stability control agent, nucleating agent, filler, antioxidant, acid scavenger, ultraviolet stabilizer, flame retardant, lubricant, processing aid, extrusion aid or a combination thereof.

In another aspect, the invention relates to foamable compositions comprising the ethylene/α-olefin interpolymer disclosed herein and a blowing agent. In one embodiment, the foamable composition further comprises a polyolefin. In another embodiment, the foamable composition does not comprise a cross-linking agent.

In another aspect, the invention relates to foam articles made from a foam comprising the ethylene/α-olefin interpolymer disclosed herein. In one embodiment, the foam article is suitable for acoustical insulation, vibration control, cushioning, specialty packaging, automotive soft touch, thermal insulation or impact absorption.

Additional aspects of the invention and characteristics and properties of various embodiments of the invention become apparent with the following description.

DETAILED DESCRIPTION OF THE INVENTION

General Definitions

Figure 1:
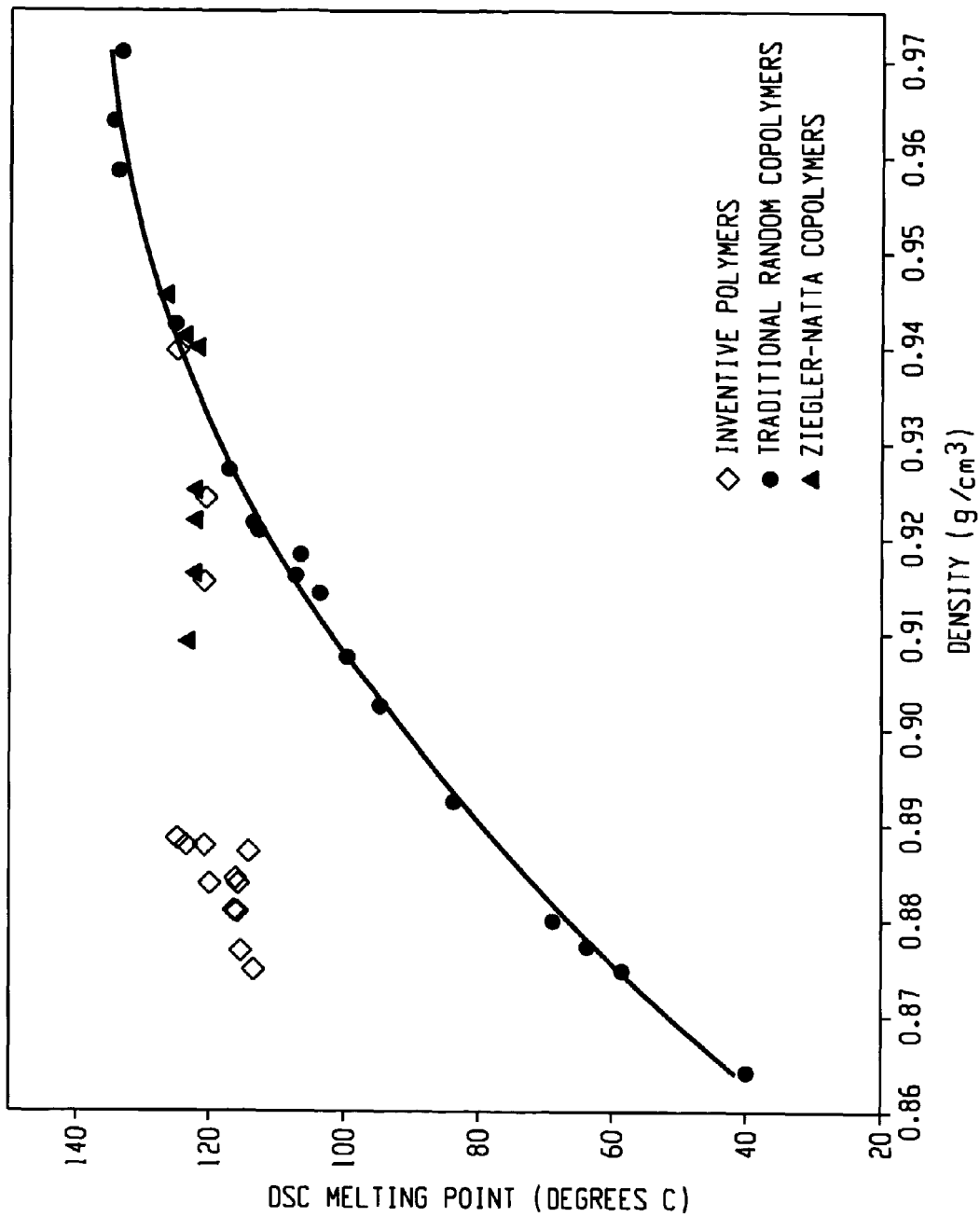
FIG. 1 shows the melting point/density relationship for the inventive polymers (represented by diamonds) as compared to traditional random copolymers (represented by circles) and Ziegler-Natta copolymers (represented by triangles).

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer"are used interchangeably herein. In some embodiments, the multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376,835 (insert when known), Attorney Docket No. 385063-999558 entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.

The term "crystalline" if employed, refers to a polymer that possesses a first order transition or crystalline melting point (Tm) as determined by differential scanning calorimetry (DSC) or equivalent technique. The term can be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R = R^L + k*(R^U - R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

Embodiments of the invention provide soft foams comprising at least one ethylene/α-olefin interpolymer disclosed herein wherein the foam has a density from about 10 to 150 kg/m$^3$. In some embodiments, the ethylene/α-olefin interpolymers are a multi-block copolymer comprising at least one soft block and at least one hard block. The soft foams disclosed herein can be prepared from a foamable composition comprising at least one ethylene/α-olefin interpolymer and a blowing agent. The soft foams possess a well balance of desirable properties that are suitable for a variety of applications such as acoustical insulation, vibration control, cushioning, specialty packaging, automotive soft touch, thermal insulation and impact absorption. In some embodiments, the foam contains less than 5% of gel measured according to ASTM D-2765-84 Method A. In some embodiments, the foams are cross-linked. In other embodiments, the foams are not cross-linked.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{ and preferably}$$

$$T_m \geq -6288.1 + 13141(d) - 6720.3(d)^2, \text{ and more preferably}$$

$$T_m \geq 858.91 - 1825.3(d) + 1112.8(d)^2.$$

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
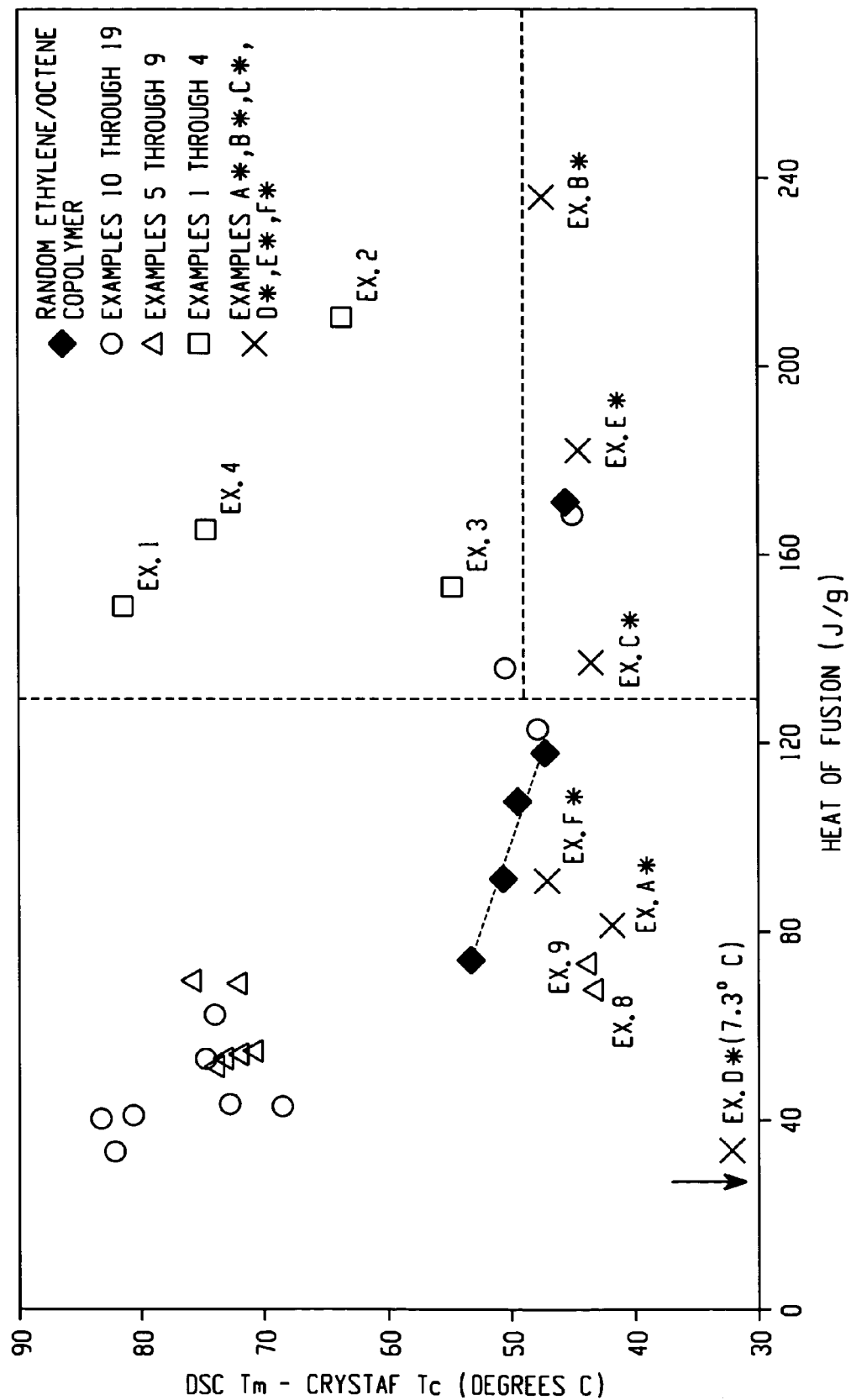
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer Examples 10-19. The "X" symbols represent polymer Comparative Examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$\Delta T > -0.1299(\Delta H) + 62.81$, and preferably $\Delta T \geq -0.1299(\Delta H) + 64.38$, and more preferably $\Delta T \geq -0.1299(\Delta H) + 65.95$, for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation $\Delta T = -0.1299 (\Delta H) + 62.81$.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the $M_w/M_n$ of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; and preferably $Re \geq 1491 - 1629(d)$; and more preferably $Re > 1501 - 1629(d)$; and even more preferably $Re \geq 1511 - 1629(d)$.

Figure 3:
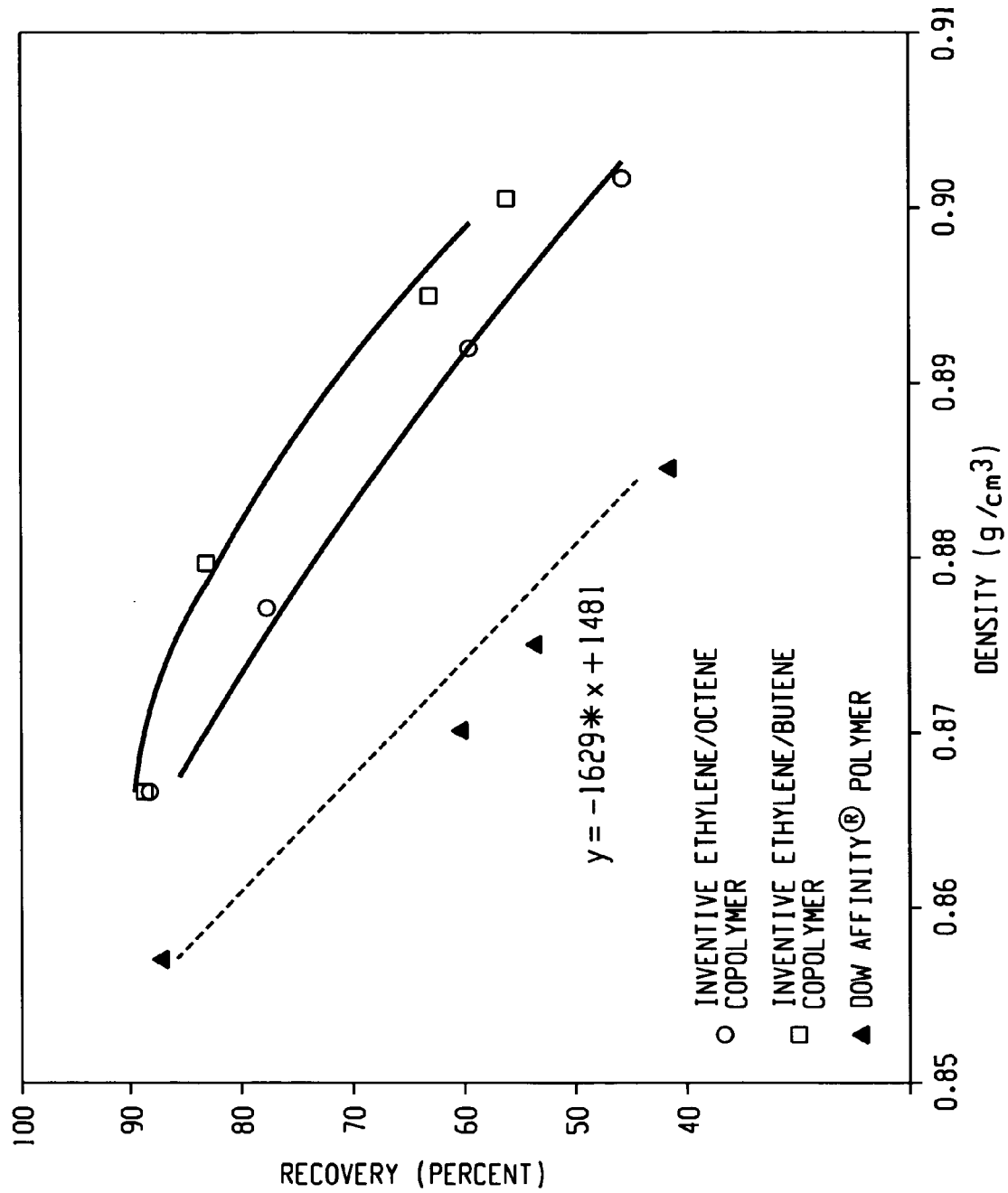
FIG. 3 shows the effect of density on elastic recovery for unoriented films made from inventive interpolymers (represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength ≧11 MPa, more preferably a tensile strength ≧13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the $M_w/M_n$ of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area $[CH_3/CH_2]$ from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl:methylene area ratio $[CH_3/CH_2]$ of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

Figure 4:
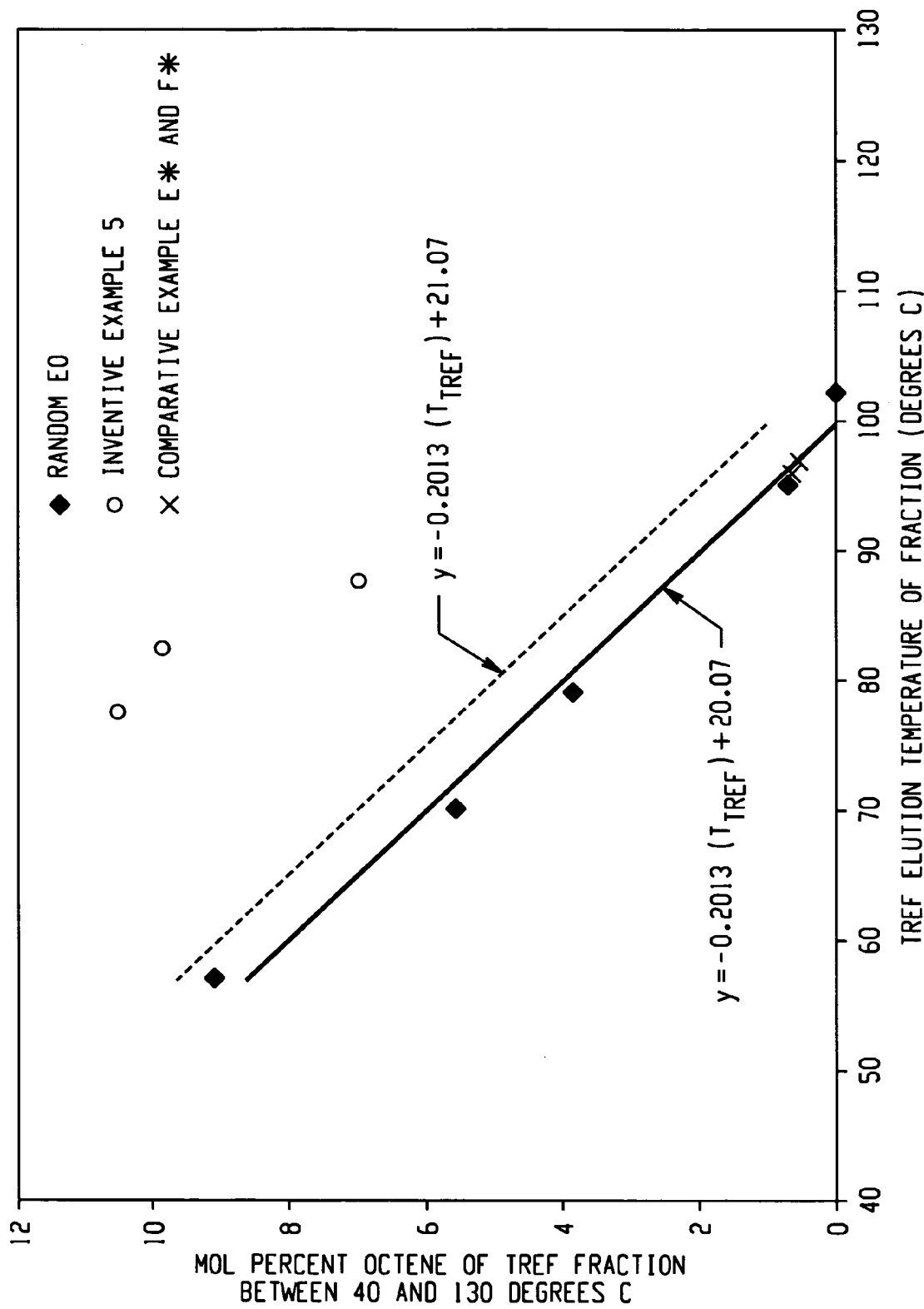
FIG. 4 is a plot of octene content of TREF fractionated ethylene/1-octene copolymer fractions versus TREF elution temperature of the fraction for the polymer of Example 5 (represented by the circles) and comparative polymer Comparative Examples E* and F* (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of several block ethylene/1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
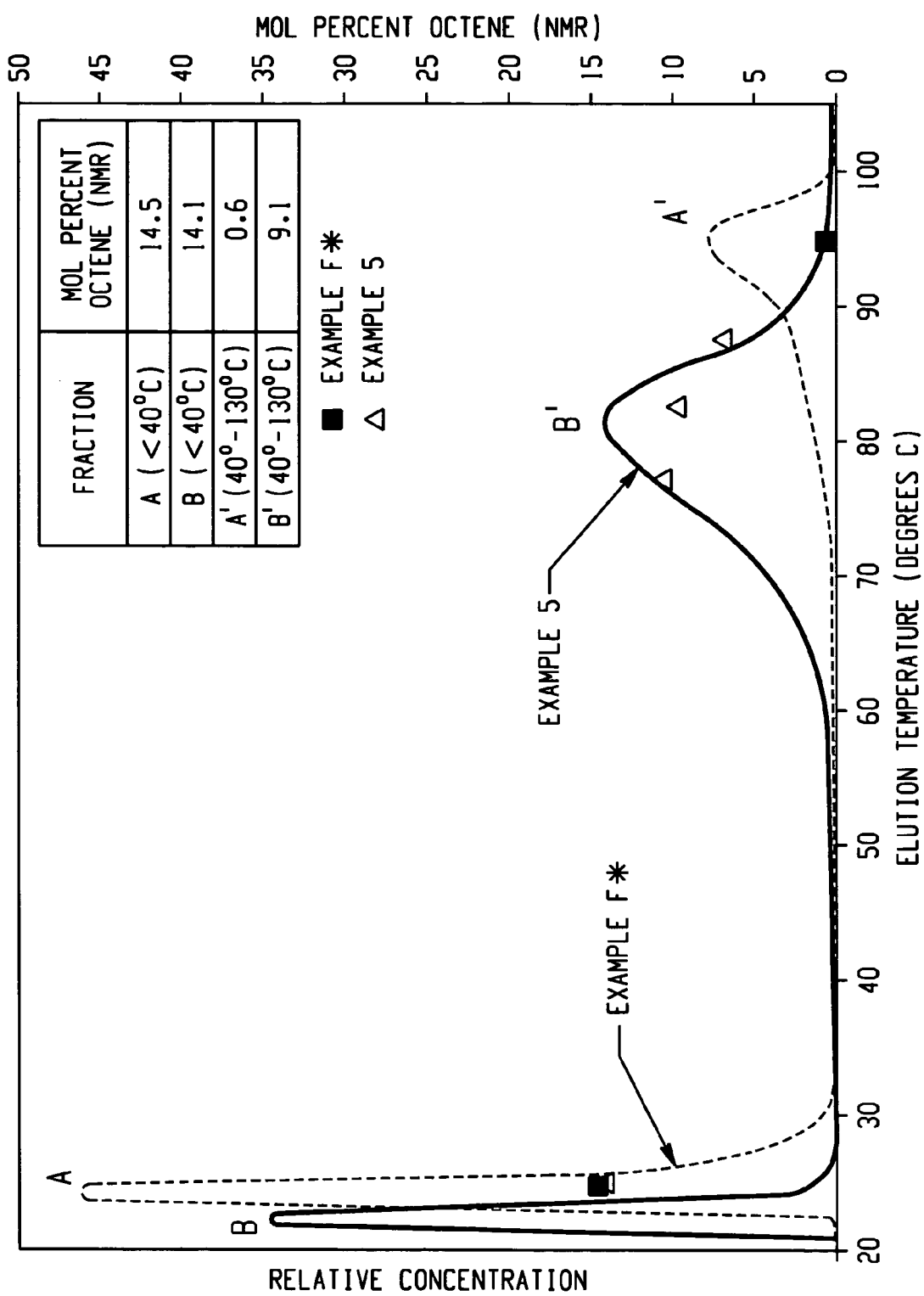
FIG. 5 is a plot of octene content of TREF fractionated ethylene/1-octene copolymer fractions versus TREF elution temperature of the fraction for the polymer of Example 5 (curve 1) and for polymer Comparative Examples F* (curve 2). The squares represent polymer Comparative Examples F*; and the triangles represent Example 5.

FIG. 5 graphically displays the TREF curve and comonomer contents of polymer fractions for Example 5 and comparative F to be discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the $M_w/M_n$ of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm³, and more especially for polymers having more than about 1 mole percent comonomer, the blocked interpolymer has a comonomer content of the TREF fraction eluting between 40 and 130° C. greater than or equal to the quantity (−0.1356) T+13.89, more preferably greater than or equal to the quantity (−0.1356) T+14.93, and most preferably greater than or equal to the quantity (−0.2013)T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm³, and more especially for polymers having more than about 1 mole percent comonomer, the blocked interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$T_m \geq (-5.5926)(\text{mol percent comonomer in the fraction}) + 135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)} \leq (3.1718)(ATREF \text{ elution temperature in Celsius}) - 136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion (J/gm)} \leq (1.1312)(ATREF \text{ elution temperature in Celsius}) + 22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area $[CH_3/CH_2]$ from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100. ; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{Ln P_X - Ln P_{XO}}{Ln P_A - Ln P_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K, $P_A$ is 1.

$T_{AB}$ is the ATREF temperature for a random copolymer of the same composition and having an ethylene mole fraction of $P_{AB}$. $T_{AB}$ can be calculated from the following equation:

$$Ln\, P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$Ln\, P = -237.83/T_{ATREF} + 0.639$$

$T_{XO}$ is the ATREF temperature for a random copolymer of the same composition and having an ethylene mole fraction of $P_X$. $T_{XO}$ can be calculated from $LnP_X = \alpha/T_{XO} + \beta$. Conversely, $P_{XO}$ is the ethylene mole fraction for a random copolymer of the same composition and having an ATREF temperature of $T_X$, which can be calculated from $Ln\, P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about s 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Figure 6:
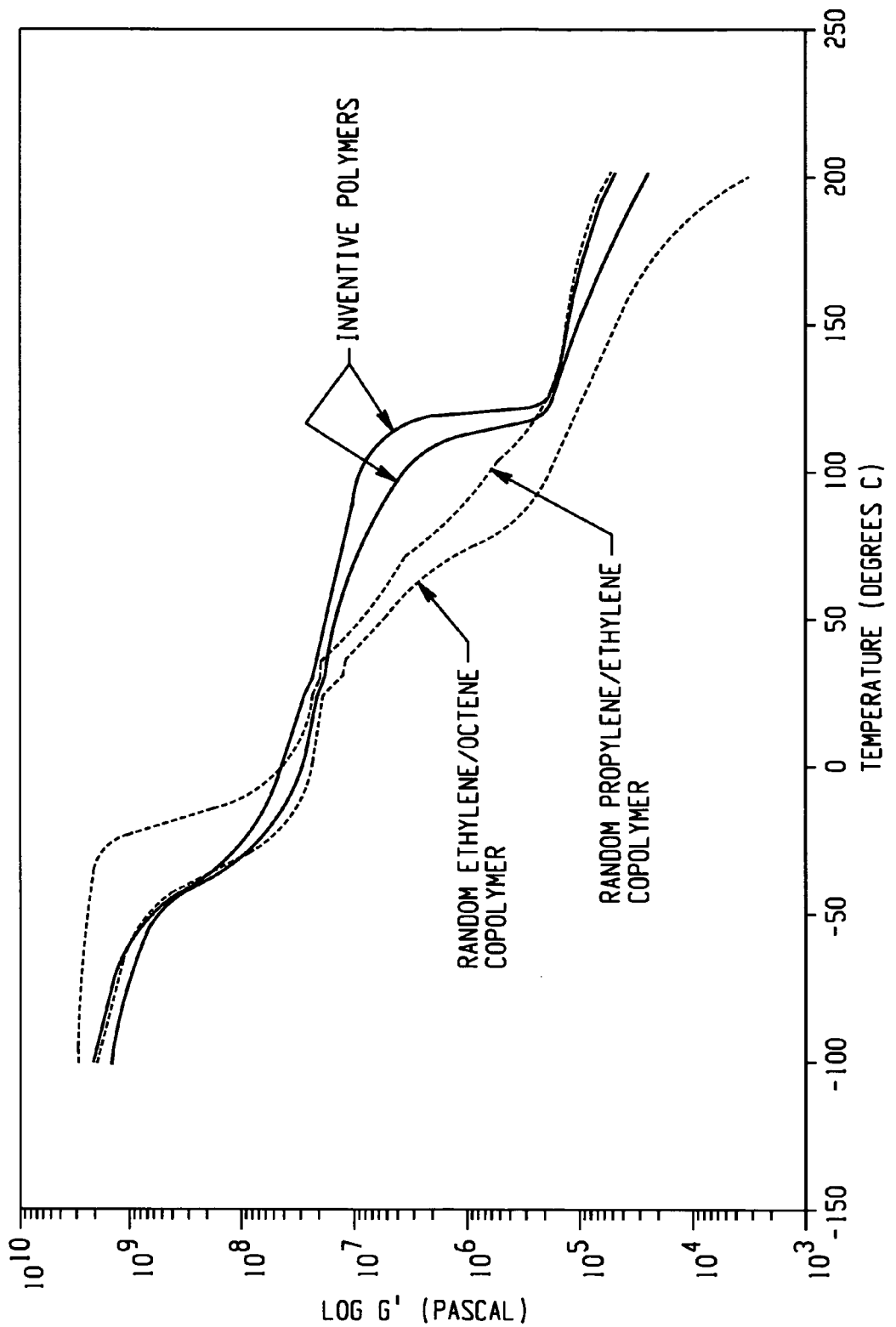
FIG. 6 is a graph of the log of storage modulus as a function of temperature for comparative ethylene/1-octene copolymer (curve 2) and propylene/ethylene copolymer (curve 3) and for two ethylene/1-octene block copolymers of the invention made with differing quantities of chain shuttling agent (curves 1).

Further, the inventive polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
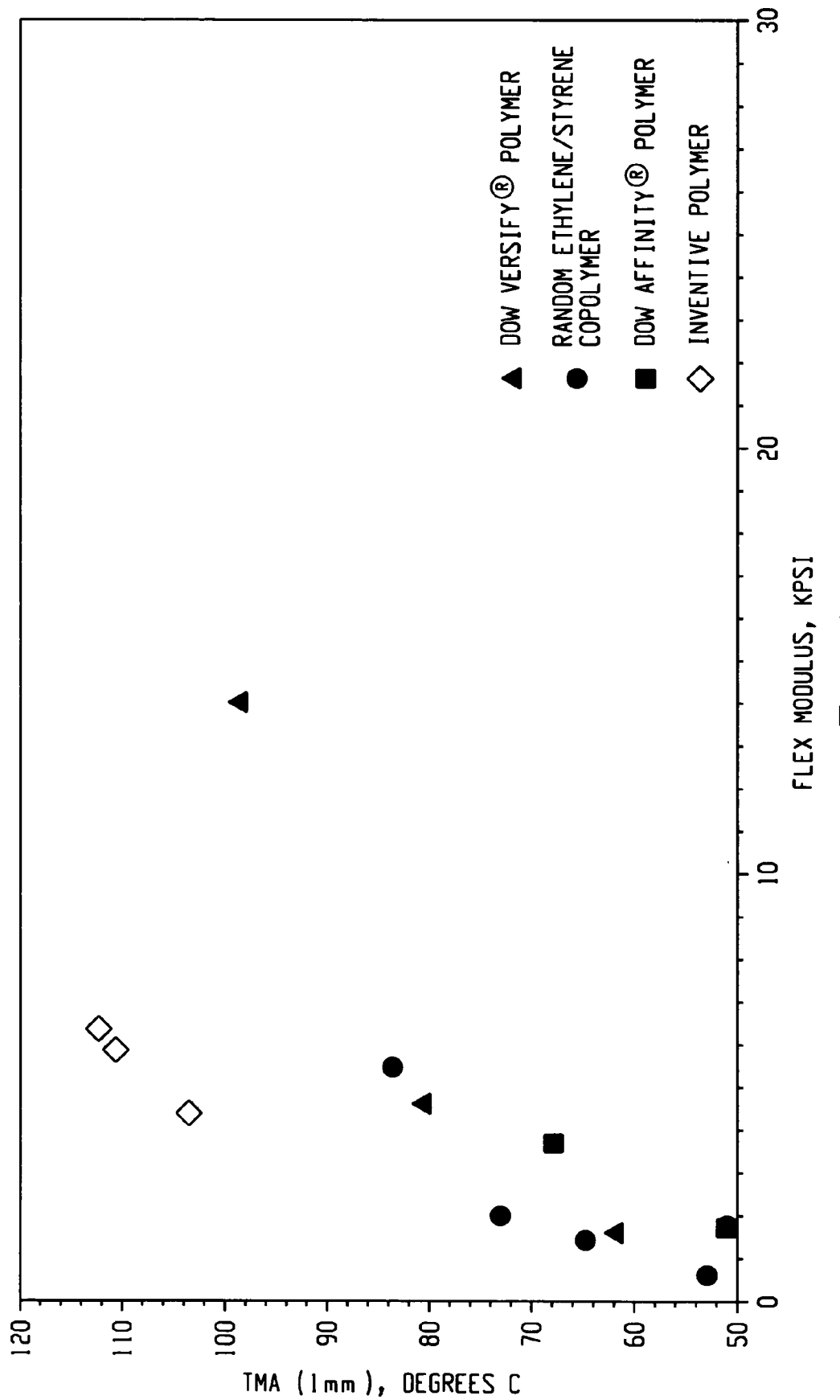
FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/5662938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03/40195, 2003US0204017, U.S. Ser. No. 10/429,024, filed May 2, 2003, and WO 04/24740.

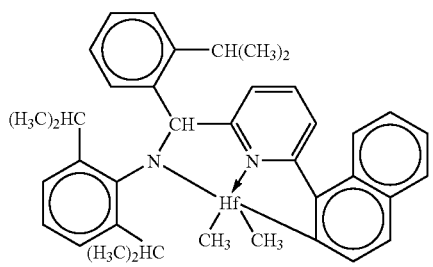

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429, 024, filed May 2, 2003, and WO 04/24740.

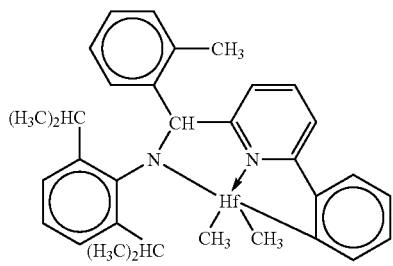

Catalyst (A3) is bis[N,N'''-(2,4,6-tri(methylphenyl)amido) ethylenediamine]hafnium dibenzyl.

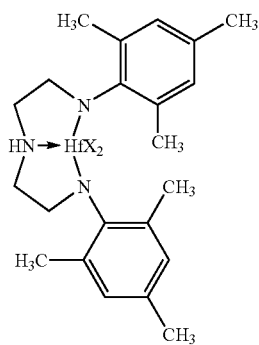

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

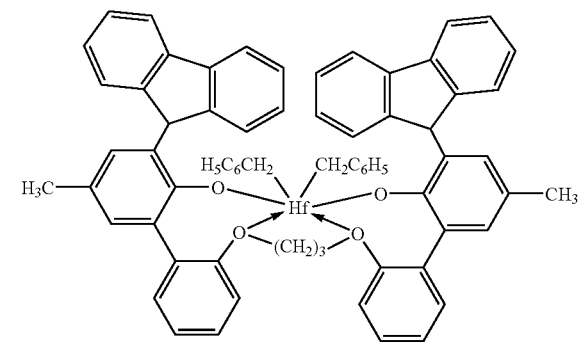

Catalyst (B1) is 1,2-bis-(3,5-di-t-butylphenylene)(1-(N-(1-methylethyl)immino)methyl)(2-oxoyl) zirconium dibenzyl

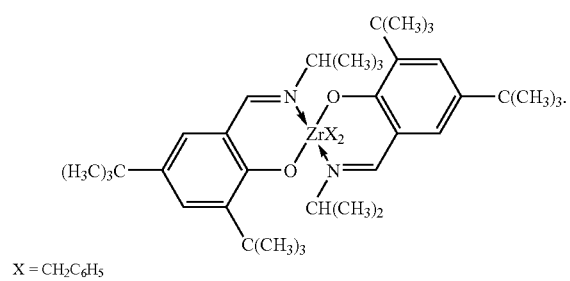

X = CH₂C₆H₅

Catalyst (B2) is 1,2-bis-(3,5-di-t-butylphenylene)(1-(N-(2-methylcyclohexyl)-immino)methyl)(2-oxoyl) zirconium dibenzyl

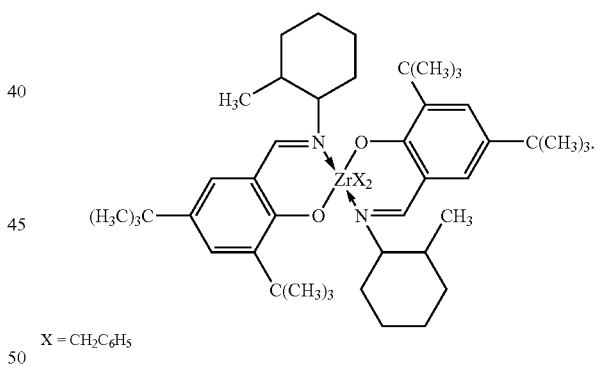

X = CH₂C₆H₅

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

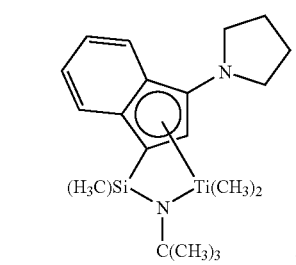

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

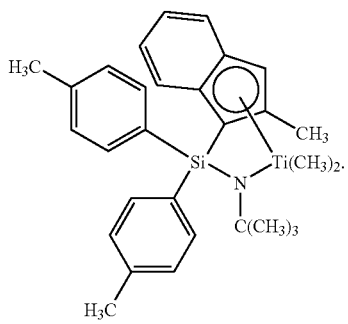

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

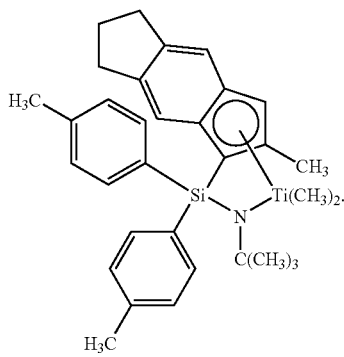

Catalyst (D1) is bis(dimethyldisiloxane)(indene-1-yl)zirconium dichloride available from Sigma-Aldrich:

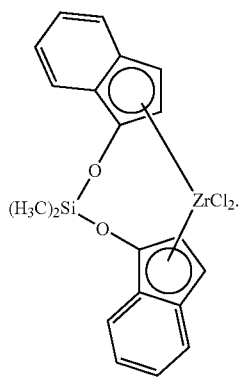

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

Preparation of Soft Foams

The soft foams disclosed herein can be prepared from a foamable composition comprising at least one blowing agent and at least one ethylene/α-olefin interpolymer disclosed herein. Optionally, the foamable composition may further comprise at least a second polymer component, at least one other additive or a combination thereof. Non-limiting examples of suitable additives include cross-linking agents, grafting initiators, cross-linking catalysts, blowing agent activators (e.g., zinc oxide, zinc stearate and the like), coagents (e.g., triallyl cyanurate), plasticizers, colorants or pigments, stability control agents, nucleating agents, fillers, antioxidants, acid scavengers, ultraviolet stabilizers, flame retardants, lubricants, processing aids, extrusion aids, and combinations thereof. In some embodiments, the foamable composition further comprises a cross-linking agent. In other embodiments, the foamable composition does not comprise a cross-linking agent The soft foams disclosed herein may take any physical forms known in the art, such as sphere, cylinder, disk, cube, prism, sheet, plank, foam slab stock or irregular shapes. Further, they can be injection molded articles, compression molded articles, or extruded articles. Other useful forms are expandable or foamable particles, moldable foam particles, or beads, and articles formed by expansion and/or coalescing and welding of those particles.

In some soft foam applications such as acoustical insulation, vibration control, cushioning, specialty packaging, automotive soft touch, and impact absorption, the soft foams can be substantially noncross-linked or uncross-linked. A soft foam is substantially noncross-linked or uncross-linked when the foam contains no more than 5% gel per ASTM D-2765-84 Method A. However, a slight degree of cross-linking, which can occur naturally without the use of cross-linking agents or radiation, is permissible. In some embodiments, the soft foam disclosed herein contains no more than 10% of gel, no more than 5% of gel, no more than 4 of % gel, no more than 3% of gel, no more than 2% of gel, no more than 1% gel, no more than 0.5% of gel, no more than 0.1% of gel, or no more than 0.01% of gel per ASTM D-2765-84 Method A. In other embodiments, the soft foam disclosed herein contains no more than 5% of gel. In further embodiments, the soft foam disclosed herein contains no more than 3% of gel. In further embodiments, the soft foam disclosed herein contains no more than 1% of gel. In further embodiments, the soft foam disclosed herein contains no more than 0.5% of gel.

The soft foams disclosed herein can have a density between about 10 and 150 kg/m$^3$, from about 10 to about 100 kg/m$^3$, or from about 10 to about 50 kg/m$^3$. Further, the soft foams can have an average cell size from about 0.05 to about 5.0 mm, from about 0.2 to about 2.0 mm, from about 0.1 to about 1.5 mm, from about 0.1 to about 1.0 mm, or from about 0.2 to about 0.6 mm according to ASTM D3576.

The soft foams disclosed herein can be either closed-celled or open-celled. A foam is a closed cell foam when the foam contains 80% or more closed cells or less than 20% open cells according to ASTM D2856-A. In some embodiments, the soft foams disclosed herein can have less than about 1% open cells, less than about 10% open cells, less than about 20% open cells, less than about 30% open cells, less than about 40% open cells, less than about 50% open cells, less than about 60% open cells, less than about 70% open cells, less than about 80% open cells or less than about 90% open cells.

In other embodiments, the soft foams disclosed herein can have between about 10% and about 90% open cells, between about 10% and about 50% open cells, between about 50% and about 90% open cells, or between about 10% and about 30% open cells.

In some embodiments, the foamable composition comprises the ethylene/α-olefin interpolymer disclosed herein. In other embodiments, the foamable composition comprises a polymer blend (hereinafter "polymer blend") comprising the ethylene/α-olefin interpolymer and a second polymer component. Some non-limiting examples of the second polymer component include EVA, polyolefins (e.g., polyethylene and polypropylene), foamable polymers (e.g., polystyrene, ABS, SBS and the like) and combinations thereof. In some embodiments, the second polymer component is EVA, polyethylene, polypropylene, polystyrene, ABS, SBS or a combination thereof. In other embodiments, the second polymer component is blended with the ethylene/α-olefin interpolymer before added to the foamable composition. In other embodiments, the second polymer component is added directly to the foamable composition without pre-blending with the ethylene/α-olefin interpolymer.

The weight ratio of the ethylene/α-olefin interpolymer to the second polymer component in the polymer blend can be between about 1:99 and about 99:1, between about 1:50 and about 50:1, between about 1:25 and about 25:1, between about 1:10 and about 10:1, between about 1:9 and about 9:1, between about 1:8 and about 8:1, between about 1:7 and about 7:1, between about 1:6 and about 6:1, between about 1:5 and about 5:1, between about 1:4 and about 4:1, between about 1:3 and about 3:1, between about 1:2 and about 2:1, between about 3:7 and about 7:3 or between about 2:3 and about 3:2.

In some embodiments, the second polymer component is a polyolefin. Any polyolefin that is partially or totally compatible with the ethylene/α-olefin interpolymer may be used. Non-limiting examples of suitable polyolefins include polyethylenes; polypropylenes; polybutylenes (e.g., polybutene-1); polypentene-1; polyhexene-1; polyoctene-1; polydecene-1; poly-3-methylbutene-1; poly-4-methylpentene-1; polyisoprene; polybutadiene; poly-1,5-hexadiene; interpolymers derived from olefins; interpolymers derived from olefins and other polymers such as polyvinyl chloride, polystyrene, polyurethane, and the like; and mixtures thereof. In some embodiments, the polyolefin is a homopolymer such as polyethylene, polypropylene, polybutylene, polypentene-1, poly-3-methylbutene-1, poly-4-methylpentene-1, polyisoprene, polybutadiene, poly-1,5-hexadiene, polyhexene-1, polyoctene-1 and polydecene-1.

Some non-limiting examples of suitable polyethylenes include ultra low density polyethylene (ULDPE), linear low density polyethylene (LLDPE), low density polyethylene (LDPE), medium density polyethylene (MDPE), high density polyethylene (HDPE), high molecular weight high density polyethylene (HMW-HDPE), ultra high molecular weight polyethylene (UHMW-PE) and combinations thereof. Some non-limiting examples of polypropylenes include low density polypropylene (LDPP), high density polypropylene (HDPP), high-melt strength polypropylene (HMS-PP) and combinations thereof. In some embodiments, the second polymer component is or comprises high-melt-strength polypropylene (HMS-PP), low density polyethylene (LDPE) or a combination thereof.

The blowing agents suitable for making the soft foams disclosed herein can include, but are not limited to, inorganic blowing agents, organic blowing agents, chemical blowing agents and combinations thereof. Some blowing agents are disclosed in Sendijarevic et al., "Polymeric Foams And Foam Technology," Hanser Gardner Publications, Cincinnati, Ohio, 2nd edition, Chapter 18, pages 505-547 (2004), which is incorporated herein by reference.

Non-limiting examples of suitable inorganic blowing agents include carbon dioxide, nitrogen, argon, water, air, nitrogen, and helium. Non-limiting examples of suitable organic blowing agents include aliphatic hydrocarbons having 1-6 carbon atoms, aliphatic alcohols having 1-3 carbon atoms, and fully and partially halogenated aliphatic hydrocarbons having 1-4 carbon atoms. Non-limiting examples of suitable aliphatic hydrocarbons include methane, ethane, propane, n-butane, isobutane, n-pentane, isopentane, neopentane, and the like. Non-limiting examples of suitable aliphatic alcohols include methanol, ethanol, n-propanol, and isopropanol. Non-limiting examples of suitable fully and partially halogenated aliphatic hydrocarbons include fluorocarbons, chlorocarbons, and chlorofluorocarbons. Non-limiting examples of suitable fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Non-limiting examples of suitable partially halogenated chlorocarbons and chlorofluorocarbons include methyl chloride, methylene chloride, ethyl chloride, 1,1,1-trichloroethane, 1,1-dichloro-1-fluoroethane (HCFC-141b), 1-chloro-1,1 difluoroethane (HCFC-142b), 1,1-dichloro-2,2,2-trifluoroethane (HCFC-123) and 1-chloro-1,2,2,2-tetrafluoroethane(HCFC-124). Non-limiting examples of suitable fully halogenated chlorofluorocarbons include trichloromonofluoromethane (CFC-11), dichlorodifluoromiethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Non-limiting examples of suitable chemical blowing agents include azodicarbonamide, azodiisobutyro-nitrile, benezenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine. In some embodiments, the blowing agent is azodicarbonamide isobutane, $CO_2$, or a mixture of thereof.

The amount of the blowing agent in the foamable composition disclosed herein may be from about 0.1 to about 20 wt %, from about 0.1 to about 10 wt %, or from about 0.1 to about 5 wt %, based on the weight of the ethylene/α-olefin interpolymer or the polymer blend. In other embodiments, the amount of the blowing agent is from about 0.2 to about 5.0 moles per kilogram of the interpolymer or polymer blend, from about 0.5 to about 3.0 moles per kilogram of the interpolymer or polymer blend, or from about 1.0 to about 2.50 moles per kilogram of the interpolymer or polymer blend.

The soft foams disclosed herein can be perforated to enhance or accelerate permeation of the blowing agent from the foam cells and/or air into the foam cells. In some embodiments, the soft foams are perforated to form channels which extend entirely through the soft foam from one surface to another or partially through the soft foam. The channels can be spaced up to about 2.5 centimeters or up to about 1.3 centimeters apart. The channels can be present over substantially an entire surface of the soft foam and preferably are uniformly dispersed over the surface. In other embodiments, the soft foams can employ a stability control agent of the type described below in combination with perforation to allow accelerated permeation or release of the blowing agent while maintaining a dimensionally stable foam. The teachings of foam perforation are disclosed in U.S. Pat. Nos. 5,424,016 and 5,585,058, both of which are incorporated herein by reference.

Optionally, the foamable compositions disclosed herein may comprise a cross-linking agent. Any cross-linking agent that can cross-link the ethylene/α-olefin interpolymer or the polymer blend disclosed herein can be used. When used, the cross-linking agent can be incorporated into the ethylene/α-olefin interpolymer or the polymer blend in the same manner as the blowing agent. The amount of the cross-linking agent in the foamable compositions or soft foams can be from about greater than 0 to about 10 wt %, from about 0.1 to about 7.5 wt %, or from about 1 to about 5 wt % based on the weight of the ethylene/α-olefin interpolymer or the polymer blend.

When a cross-linking agent is used, the cross-linking of the soft foams can be induced by activating the cross-linking agent in the foamable composition. The cross-linking agent can be activated by exposing it to a temperature above its decomposition temperature. Alternatively, the cross-linking agent can be activated by exposing it to a radiation that causes the generation of free radicals from the cross-linking agent. Similarly, the foaming or expansion of the soft foams disclosed herein can be induced by activating the blowing agent in the foamable composition. In some embodiments, the blowing agent is activated by exposing it to a temperature above its activation temperature. Generally, the activations of the cross-linking and foaming can occur either simultaneously or sequentially. In some embodiments, the activations occur simultaneously. In other embodiments, the activation of the cross-linking occurs first and the activation of the foaming occurs next. In further embodiments, the activation of the foaming occurs first and the activation of the cross-linking occurs next.

The foamable composition can be prepared or processed at a temperature of less than 150° C. to prevent the decomposition of the blowing agent and the cross-linking agent if it is used. When radiation cross-linking is used, the foamable composition can be prepared or processed at a temperature of less than 160° C. to prevent the decomposition of the blowing agent. In some embodiments, the foamable composition can be extruded or processed through a die of desired shape to form a foamable structure. Next, the foamable structure can be expanded and perhaps cross-linked if a cross-linking agent is used at an elevated temperature (e.g., from about 150° C. to about 250° C.) to activate the blowing agent and perhaps the cross-linking agent to form a foam structure. In some embodiments, the foamable structure can be irradiated to cross-link the polymer material, which can then be expanded at the elevated temperature as described above. In other embodiments, the foamable structure is not cross-linked.

Some suitable cross-linking agents have been disclosed in Zweifel Hans et al., *"Plastics Additives Handbook,"* Hanser Gardner Publications, Cincinnati, Ohio, 5th edition, Chapter 14, pages 725-812 (2001); *Encyclopedia of Chemical Technology*, Vol. 17, 2nd edition, Interscience Publishers (1968); and Daniel Seem, *"Organic Peroxides,"* Vol. 1, Wiley-Interscience, (1970), all of which are incorporated herein by reference. In some embodiments, there is no cross-linking agent in the foamable compositions or soft foams disclosed herein.

Non-limiting examples of suitable cross-linking agents include peroxides, phenols, azides, aldehyde-amine reaction products, substituted ureas, substituted guanidines; substituted xanthates; substituted dithiocarbamates; sulfur-containing compounds, such as thiazoles, sulfenamides, thiuramidisulfides, paraquinonedioxime, dibenzoparaquinonedioxime, sulfur; imidazoles; silanes and combinations thereof.

Non-limiting examples of suitable organic peroxide cross-linking agents include alkyl peroxides, aryl peroxides, peroxyesters, peroxycarbonates, diacylperoxides, peroxyketals, cyclic peroxides and combinations thereof. In some embodiments, the organic peroxide is dicumyl peroxide, t-butylisopropylidene peroxybenzene, 1,1-di-t-butyl peroxy-3,3,5-trimethylcyclohexane, 2,5-dimethyl-2,5-di(t-butyl peroxy) hexane, t-butyl-cumyl peroxide, di-t-butyl peroxide, 2,5-dimethyl-2,5-di-(t-butyl peroxy) hexyne or a combination thereof. In one embodiment, the organic peroxide is dicumyl peroxide. Additional teachings regarding organic peroxide cross-linking agents are disclosed in C. P. Park, supra, pp. 198-204, which is incorporated herein by reference.

Non-limiting examples of suitable azide cross-linking agents include azidoformates, such as tetramethylenebis (azidoformate); aromatic polyazides, such as 4,4'-diphenyl-methane diazide; and sulfonazides, such as p,p'-oxybis(benzene sulfonyl azide). The disclosure of azide cross-linking agents can be found in U.S. Pat. Nos. 3,284,421 and 3,297,674, both of which are incorporated herein by reference.

The poly(sulfonyl azide) is any compound having at least two sulfonyl azide groups (i.e., $-SO_2N_3$) that are reactive towards the ethylene/α-olefin interpolymer disclosed herein. In some embodiments, the poly(sulfonyl azide)s have a structure of X—R—X wherein each X is $-SO_2N_3$ and R represents an unsubstituted or inertly substituted hydrocarbyl, hydrocarbyl ether or silicon-containing group. In some embodiments, the R group has sufficient carbon, oxygen or silicon, preferably carbon, atoms to separate the sulfonyl azide groups sufficiently to permit a facile reaction between the ethylene/α-olefin interpolymer and the sulfonyl azide groups. In other embodiments, the R group has at least 1, at least 2, or at least 3 carbon, oxygen or silicon, preferably carbon, atoms between the sulfonyl azide groups. The term "inertly substituted" refers to substitution with atoms or groups which do not undesirably interfere with the desired reaction(s) or desired properties of the resulting cross-linked polymers. Such groups include fluorine, aliphatic or aromatic ethers, siloxanes and the like. Non-limiting examples of suitable structures of R include aryl, alkyl, alkaryl, arylalkyl, silanyl, heterocyclyl, and other inert groups. In some embodiments, the R group includes at least one aryl group between the sulfonyl groups. In other embodiments, the R group includes at least two aryl groups (such as when R is 4,4' diphenylether or 4,4'-biphenyl). When R is one aryl group, it is preferred that the group have more than one ring, as in the case of naphthylene bis(sulfonyl azides). In some embodiments, the poly(sulfonyl)azides include 1,5-pentane bis(sulfonylazide), 1,8-octane bis(sulfonyl azide), 1,10-decane bis (sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and combinations thereof. In other embodiments, the poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and combinations thereof.

Non-limiting examples of suitable aldehyde-amine reaction products include formaldehyde-ammonia, formaldehyde-ethylchloride-ammonia, acetaldehyde-ammonia, formaldehyde-aniline, butyraldehyde-aniline, heptaldehyde-aniline, and combinations thereof.

Non-limiting examples of suitable substituted ureas include trimethylthiourea, diethylthiourea, dibutylthiourea, tripentylthiourea, 1,3-bis(2-benzothiazolylmercaptomethyl) urea, N,N-diphenylthiourea, and combinations thereof.

Non-limiting examples of suitable substituted guanidines include diphenylguanidine, di-o-tolylguanidine, diphenylguanidine phthalate, the di-o-tolylguanidine salt of dicatechol borate, and combinations thereof.

Non-limiting examples of suitable substituted xanthates include zinc ethylxanthate, sodium isopropylxanthate, butylxanthic disulfide, potassium isopropylxanthate, zinc butylxanthate, and combinations thereof.

Non-limiting examples of suitable dithiocarbamates include copper dimethyl-, zinc dimethyl-, tellurium diethyl-, cadmium dicyclohexyl-, lead dimethyl-, lead dimethyl-, selenium dibutyl-, zinc pentamethylene-, zinc didecyl-, zinc isopropyloctyl-dithiocarbamate, and combinations thereof.

Non-limiting examples of suitable thiazoles include 2-mercaptobenzothiazole, zinc mercaptothiazolyl mercaptide, 2-benzothiazolyl-N,N-diethylthiocarbamyl sulfide, 2,2'-dithiobis(benzothiazole), and combinations thereof.

Non-limiting examples of suitable imidazoles include 2-mercaptoimidazoline 2-mercapto-4,4,6-trimethyldihydropyrimidine, and combinations thereof.

Non-limiting examples of suitable sulfenamides include N-t-butyl-2-benzothiazole-, N-cyclohexylbenzothiazole-, N,N-diisopropylbenzothiazole-, N-(2,6-dimethylmorpholino)-2-benzothiazole-, N,N-diethylbenzothiazole-sulfenamide, and combinations thereof.

Non-limiting examples of suitable thiuramidisulfides include N,N'-diethyl-, tetrabutyl-, N,N'-diisopropyldioctyl-, tetramethyl-, N,N'-dicyclohexyl-, N,N'-tetralaurylthiuramidisulfide, and combinations thereof.

In some embodiments, the cross-linking agents are silanes. Any silane that can effectively graft to and/or cross-link the ethylene/α-olefin interpolymer or the polymer blend disclosed herein can be used. Non-limiting examples of suitable silane cross-linking agents include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group such as a hydrocarbyloxy, hydrocarbonyloxy, and hydrocarbylamino group. Non-limiting examples of suitable hydrolyzable groups include methoxy, ethoxy, formyloxy, acetoxy, proprionyloxy, alkyl and arylamino groups. In other embodiments, the silanes are the unsaturated alkoxy silanes which can be grafted onto the interpolymer. Some of these silanes and their preparation methods are more fully described in U.S. Pat. No. 5,266,627, which is incorporated herein by reference. In further embodiments, the silane cross-linking agents are vinyltrimethoxysilane, vinyltriethoxysilane, vinyltris(2-methoxyethoxy)silane, vinyltriacetoxysilane, vinylmethyldimethoxysilane, 3-methacryloyloxypropyltrimethoxysilane, and combinations thereof.

The amount of the silane cross-linking agent can vary widely, depending upon the nature of the ethylene/α-olefin interpolymer or the polymer blend, the silane employed, the processing conditions, the amount of grafting initiator, the ultimate application, and other factors. When vinyltrimethoxysilane (VTMOS) is used, the amount of VTMOS is generally at least about 0.1 weight percent, at least about 0.5 weight percent, or at least about 1 weight percent, based on the combined weight of the silane cross-linking agent and the interpolymer or the polymer blend.

Optionally, the foamable composition disclosed herein may comprise a grafting initiator. Those skilled in the art will be readily able to select the amount of the grafting initiator based on the characteristics of the ethylene/α-olefin interpolymer or the polymer blend, such as molecular weight, molecular weight distribution, comonomer content, as well as the presence of cross-linking enhancing coagents, additives, and the like.

Optionally, the foamable composition disclosed herein may comprise a catalyst. Any cross-linking catalyst that can promote the cross-linking of the ethylene/α-olefin interpolymer or the polymer blend can be used. Non-limiting examples of suitable catalysts include organic bases, carboxylic acids, and organometallic compounds. In some embodiments, the catalyst includes organic titanates and complexes or carboxylates of lead, cobalt, iron, nickel, zinc and tin. In other embodiments, the catalyst is or comprises dibutyltin dilaurate, dioctyltin maleate, dibutyltin diacetate, dibutyltin dioctanoate, stannous acetate, stannous octanoate, lead naphthenate, zinc caprylate, cobalt naphthenate or a combination thereof. In further embodiments, the catalyst is or comprises a tin carboxylate such as dibutyltin dilaurate and dioctyltin maleate.

Alternatively, the cross-linking of the soft foam or foamable composition can be effected by using radiation. Non-limiting examples of suitable radiation include electron beam or beta ray, gamma rays, X-rays, or neutron rays. Radiation is believed to activate the cross-linking by generating radicals in the polymer which may subsequently combine and cross-link. Additional teachings concerning radiation cross-linking are disclosed in C. P. Park, supra, pages 198-204, which is incorporated herein by reference. In some embodiments, the soft foam or foamable composition is not cross-linked by radiation.

Those skilled in the art will be readily able to select the amount of cross-linking agent, based on the desired cross-linking level, the characteristics of the polymer such as molecular weight, molecular weight distribution, comonomer content, the presence of cross-linking enhancing coagents, other additives and the like. Since it is expressly contemplated that the ethylene/α-olefin interpolymer can be blended with other polymers such as EVA and polyolefins prior to cross-linking, those skilled in the art may use the disclosure herein as a reference point in optimizing the amount of the cross-linking agent for a particular polymer in question.

Optionally, the soft foams or foamable compositions disclosed herein can comprise at least one other additive. Any foam additive that can improve and/or control the processibility, appearance, physical, chemical, and/or mechanical properties of the foam structures or articles can be used. Any foam additive known to a person of ordinary skill in the art can be incorporated in the soft foams disclosed herein. Non-limiting examples of suitable other additives include cross-linking agents, grafting initiators, cross-linking catalysts, blowing agent activators (e.g., zinc oxide, zinc stearate and the like), coagents (e.g., triallyl cyanurate), plasticizers, colorants or pigments, stability control agents, nucleating agents, fillers, antioxidants, acid scavengers, ultraviolet (UV) stabilizers, flame retardants, lubricants, processing aids, extrusion aids, and combinations thereof. The total amount of the other additives can range from about greater than 0 to about 80%, from about 0.001% to about 70%, from about 0.01% to about 60%, from about 0.1% to about 50%, from about 1% to about 40%, or from about 10% to about 50% of the total weight of the foam. Some suitable additives have been described in Zweifel Hans et al., *"Plastics Additives Handbook,"* Hanser Gardner Publications, Cincinnati, Ohio, 5th edition (2001), which is incorporated herein by reference in its entirety.

The soft foams or foamable compositions disclosed herein may optionally comprise a stability control agent or gas permeation modifier. Any stability control agent that can enhance the dimensional stability of the soft foams can be used. Non-limiting examples of suitable stability control agents include amides and esters of $C_{10-24}$ fatty acids. Such agents are described in U.S. Pat. Nos. 3,644,230 and 4,214,054, both of which are incorporated herein by reference. In some embodiments, the stability control agents include stearyl stearamide, glycerol monostearate, glycerol monobehenate, sorbitol monostearate and combinations thereof. In general, the amount of the stability control agents is from about 0.1 to about 10 parts, from about 0.1 to about 5 parts, or from about 0.1 to about 3 parts by weight per hundred parts by weight of the polymer. In some embodiment, the stability control agent is glycerol monostearate.

The foams or foamable compositions disclosed herein may optionally comprise a nucleating agent. Any nucleating agent that can control the size of foam cells can be used. Non-limiting examples of suitable nucleating agents include inorganic substances such as calcium carbonate, talc, clay, titanium oxide, silica, barium sulfate, diatomaceous earth, citric acid, sodium bicarbonate, sodium carbonate, and combinations thereof. In some embodiments, the nucleating agent is a combination of citric acid and sodium bicarbonate or a combination of citric acid and sodium carbonate. In other embodiments, the nucleating agent is HYDROCEROL® CF 20 from Clariant Corporation, Charlotte, N.C. The amount of nucleating agent employed can range from 0.01 to 5 parts by weight per hundred parts by weight of the polymer.

In some embodiments, the soft foams or foamable compositions disclosed herein comprise an antioxidant. Any antioxidant that can prevent the oxidation of the polymer components and organic additives in the soft foams can be added to the soft foams disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, N.Y.); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the foam can be from about greater than 0 to about 5 wt %, from about 0.0001 to about 2.5 wt %, from about 0.001 to about 1 wt %, or from about 0.001 to about 0.5 wt % of the total weight of the foam. Some antioxidants have been described in Zweifel Hans et al., *"Plastics Additives Handbook,"* Hanser Gardner Publications, Cincinnati, Ohio, 5th edition, Chapter 1, pages 1-140 (2001), which is incorporated herein by reference.

In other embodiments, the soft foams or foamable compositions disclosed herein comprise a UV stabilizer that may prevent or reduce the degradation of the foams by UV radiations. Any UV stabilizer that may prevent or reduce the degradation of the foams by UV radiations can be added to the soft foams disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the foam can be from about greater than 0 to about 5 wt %, from about 0.01 to about 3 wt %, from about 0.1 to about 2 wt %, or from about 0.1 to about 1 wt % of the total weight of the foam. Some UV stabilizers have been described in Zweifel Hans et al., *"Plastics Additives Handbook,"* Hanser Gardner Publications, Cincinnati, Ohio, 5th edition, Chapter 2, pages 141-426 (2001), which is incorporated herein by reference.

In further embodiments, the soft foams or foamable compositions disclosed herein comprise a colorant or pigment. Any colorant or pigment that can change the look of the soft foams to human eyes can be added to the foams disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the soft foam can be from about greater than 0 to about 10 wt %, from about 0.1 to about 5 wt %, or from about 0.25 to about 2 wt % of the total weight of the foam. Some colorants have been described in Zweifel Hans et al., *"Plastics Additives Handbook,"* Hanser Gardner Publications, Cincinnati, Ohio, 5th edition, Chapter 15, pages 813-882 (2001), which is incorporated herein by reference.

Optionally, the soft foams or foamable compositions disclosed herein can comprise a filler. Any filler which can be used to adjust, inter alia, volume, weight, costs, and/or technical performance can be added to the soft foams disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. Where used, the amount of the filler in the soft foam can be from about greater than 0 to about 80 wt %, from about 0.1 to about 60 wt %, from about 0.5 to about 40 wt %, from about 1 to about 30 wt %, or from about 10 to about 40 wt % of the total weight of the foam. Some fillers have been disclosed in U.S. Pat. No. 6,103,803 and Zweifel Hans et al., *"Plastics Additives Handbook,"* Hanser Gardner Publications, Cincinnati, Ohio, 5th edition, Chapter 17, pages 901-948 (2001), both of which are incorporated herein by reference.

Optionally, the soft foams or foamable compositions disclosed herein can comprise a lubricant. In general, the lubricant. Any lubricant that can be used, inter alia, to modify the rheology of the molten foamable compositions, to improve the surface finish of molded foam articles, and/or to facilitate the dispersion of fillers or pigments can be added to the soft foams disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. Where used, the amount of the lubricant in the foam can be from about greater than 0 to about 5 wt %, from about 0.1 to about 4 wt %, or from about 0.1 to about 3 wt % of the total weight of the foam. Some suitable lubricants have been disclosed in Zweifel Hans et al., *"Plastics Additives Handbook,"* Hanser Gardner Publications, Cincinnati, Ohio, 5th edition, Chapter 5, pages 511-552 (2001), both of which are incorporated herein by reference.

Optionally, the soft foams or foamable compositions disclosed herein can comprise an antistatic agent. Any antistatic agent that can increase the conductivity of the soft foams and to prevent static charge accumulation can be added to the foams disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the soft foam can be from about greater than 0 to about 5 wt %, from about 0.01 to about 3 wt %, or from about 0.1 to about 2 wt % of the total weight of the foam. Some suitable antistatic agents have been disclosed in Zweifel Hans et al., *"Plastics Additives Handbook,"* Hanser Gardner Publications, Cincinnati, Ohio, 5th edition, Chapter 10, pages 627-646 (2001), both of which are incorporated herein by reference.

The processes of making polyolefin foams are described in C. P. Park, *"Polyolefin Foam"*, Chapter 9 of *Handbook of Polymer Foams and Technology*, edited by D. Klempner and K. C. Frisch, Hanser Publishers, Munich (1991), which is incorporated herein by reference.

The ingredients of the foamable composition can be mixed or blended in any suitable mixing or blending devices known to skilled artisans. The ingredients in the foamable composition can then be mixed at a temperature below the decomposition temperature of the blowing agent and perhaps the cross-linking agent if it is present to ensure that all ingredients are homogeneously mixed and remain intact. After the foamable composition is relatively homogeneously mixed, the composition is shaped and then exposed to conditions (e.g. heat, pressure, shear, etc.) over a sufficient period of time to activate the blowing agent and perhaps the cross-linking agent to make the soft foam.

In some embodiments, the ingredients of the foamable composition can be mixed and melt blended by any mixing or blending device known to a person of ordinary skill in the art. Non-limiting examples of suitable mixing or blending devices include extruders, mixers, blenders, mills, dispersers, homogenizers and the like. In other embodiments, the blowing agent is dry-blended with the ethylene/α-olefin interpolymer or the polymer blend before the foamable composition is heated to a molten form. In further embodiments, the blowing agent is added when the foamable composition is in a molten phase. In some embodiments, the foamable composition disclosed herein is extruded through a die where the cross-linking may be activated if a cross-linking agent is present. Then the extruded foamable composition may be exposed to an elevated temperature to activate the blowing agent to form the soft foams.

The soft foams disclosed herein can be prepared by conventional extrusion foaming processes. The soft foam can generally be prepared by heating the ethylene/α-olefin interpolymer or the polymer blend to form a plasticized or melt polymer material, incorporating therein a blowing agent to form a foamable composition, and extruding the foamable composition through a die to form foam products. Prior to mixing with the blowing agent, the ethylene/α-olefin interpolymer can be heated to a temperature at or above its glass transition temperature or melting point. The blowing agent can be incorporated or mixed into the molten ethylene/α-olefin interpolymer by any means known in the art such as with an extruder, mixer, blender, and the like. The blowing agent can be mixed with the molten ethylene/α-olefin interpolymer at an elevated pressure sufficient to prevent substantial expansion of the molten ethylene/α-olefin interpolymer and to generally disperse the blowing agent homogeneously therein. Optionally, a nucleating agent can be blended in the interpolymer melt or dry blended with the ethylene/α-olefin interpolymer prior to plasticizing or melting. The foamable composition can be cooled to a lower temperature to optimize physical characteristics of the foam structure. The foamable composition can be then extruded or conveyed through a die of desired shape to a zone of reduced or lower pressure to form the foam structure. The zone of lower pressure can be at a pressure lower than that in which the foamable composition is maintained prior to extrusion through the die. The lower pressure can be super-atmospheric or sub-atmospheric (vacuum), but is preferably at an atmospheric level.

The soft foam can be conveniently extruded in various shapes having a preferred foam thickness in the direction of minimum foam thickness in the range from about 1 mm to about 100 mm or more. When the soft foam is in the form of a sheet, the soft foam can have a thickness in the range from about 1 or 2 mm to about 15 mm. When the soft foam is in the form of a plank, the soft foam can have a thickness in the range from about 15 mm to about 100 mm. The desired thickness depends in part on the application.

In some embodiments, the soft foams disclosed herein are formed in a coalesced strand form by extrusion of the ethylene/α-olefin interpolymer through a multi-orifice die. The orifices can be arranged so that contact between adjacent streams of the molten extrudate occurs during the foaming process and the contacting surfaces adhere to one another with sufficient adhesion to result in a unitary foam structure. The streams of the molten extrudate exiting the die can take the form of strands or profiles, which can desirably foam, coalesce, and adhere to one another to form a unitary structure. Desirably, the coalesced individual strands or profiles should remain adhered in a unitary structure to prevent strand delamination under stresses encountered in preparing, shaping, and using the foams. Apparatuses and methods for producing foam structures in coalesced strand form are disclosed in U.S. Pat. Nos. 3,573,152 and 4,824,720, both of which are incorporated herein by reference.

In other embodiments, the soft foams disclosed herein are formed by an accumulating extrusion process as seen in U.S. Pat. No. 4,323,528, which is incorporated by reference herein. In the accumulating extrusion process, low density foams having large lateral cross-sectional areas are prepared by: 1) forming under pressure a foamable composition of the ethylene/α-olefin interpolyymer and a blowing agent at a temperature at which the viscosity of the foamable composition is sufficient to retain the blowing agent when the foamable composition is allowed to expand; 2) extruding the foamable composition into a holding zone maintained at a temperature and pressure which does not allow the foamable composition to foam, the holding zone having an outlet die defining an orifice opening into a zone of lower pressure at which the foamable composition foams, and an openable gate closing the die orifice; 3) periodically opening the gate; 4) substantially concurrently applying mechanical pressure by a movable ram on the foamable composition to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected foamable composition to expand unrestrained in at least one dimension to produce the foam structure.

In some embodiments, the soft foams disclosed herein are formed into non-crosslinked foam beads suitable for molding into articles. To make the foam beads, discrete ethylene/α-olefin interpolymer particles such as granulated ethylene/α-olefin interpolymer pellets are: (1) suspended in a liquid medium in which they are substantially insoluble such as water; (2) impregnated with a blowing agent by introducing the blowing agent into the liquid medium at an elevated pressure and temperature in an autoclave or other pressure vessel; and (3) rapidly discharged into the atmosphere or a region of reduced pressure to expand to form the foam beads. This process is well taught in U.S. Pat. Nos. 4,379,859 and 4,464,484, which are incorporated herein by reference.

In a derivative of the above process, styrene monomer can be impregnated into the suspended ethylene/α-olefin interpolymer pellets prior to impregnation with blowing agent to form a graft interpolymer with the ethylene/α-olefin interpolymer. The resulted graft interpolymer beads can be cooled and discharged from the vessel substantially unexpanded. The beads are then expanded and molded by the conventional expanded polystyrene bead molding process. The process of making some graft interpolymer beads is described in U.S. Pat. No. 4,168,353, which is incorporated herein by reference.

The foam beads can be molded into articles by any method known to a person of ordinary skill in the art. In some embodiments, the foam beads are charged to the mold, compressed by compressing the mold, and heated with a heat source such as steam to effect coalescing and welding of the foam beads to form the articles. In other embodiments, the foam beads are impregnated with air or other blowing agent at an elevated pressure and temperature prior to charging to the mold. In further embodiments, the foam beads are heated prior to charging to the mold. The beads can then be molded to blocks or shaped articles by a suitable molding method known in the art. Some of the methods are taught in U.S. Pat. Nos. 3,504,068 and 3,953,558 and in C. P. Park, supra, p. 191, pp. 197-198, and pp. 227-229, all of which are incorporated herein by reference.

In some embodiments, the soft foams disclosed herein can be prepared by either compression molding or injection molding. In other embodiments, the soft foams are prepared by compression molding at a temperature above the decomposition temperatures of the peroxide and the blowing agent which is followed by a post expansion when the mold open. In further embodiments, the soft foams are prepared by injection molding the ethylene/α-olefin interpolymer melts at temperatures below the decomposition temperatures of the peroxide and the blowing agent into molds at temperature above the decomposition temperatures of the peroxide and the blowing agent which is followed by a post expansion after opening the molds (from about 160 to about 190° C.).

In some embodiments, microcellular thermoplastic vulcanizate ("TPV") foams could be made using supercritical fluids (e.g., CO or $N_2$). Such techniques are taught in U.S. Pat. Nos. 5,158,986; 5,160,674; 5,334,356; 5,866,053; 6,169,122; 6,284,810; and 6,294,115, which are incorporated by reference herein in their entirety. The methods disclosed therein can be used in embodiments of the invention with or without modifications. TPV compositions based on the inventive polymers disclosed herein are taught in U.S. Provisional Application No. 60/718,186, filed Sep. 16, 2005, which is incorporated by reference herein in its entirety. Such TPV compositions could be used in embodiments of the invention to make microcellular TPV foams.

Blending of the Ingredients of the Foams

The ingredients of the soft foams, ie., the ethylene/α-olefin interpolymer, the blowing agent, the optional second polymer component (e.g., EVA, polyethylene, and polypropylene) and additives (e.g., the cross-linking agent) can be mixed or blended using methods known to a person of ordinary skill in the art. Non-limiting examples of suitable blending methods include melt blending, solvent blending, extruding, and the like.

In some embodiments, the ingredients of the soft foams are melt blended by a method as described by Guerin et al. in U.S. Pat. No. 4,152,189. First, all solvents, if there are any, are removed from the ingredients by heating to an appropriate elevated temperature of about 100° C. to about 200° C. or about 150° C. to about 175° C. at a pressure of about 5 torr (667 Pa) to about 10 torr (1333 Pa). Next, the ingredients are weighed into a vessel in the desired proportions and the foam is formed by heating the contents of the vessel to a molten state while stirring.

In other embodiments, the ingredients of the soft foams are processed using solvent blending. First, the ingredients of the desired foam are dissolved in a suitable solvent and the mixture is then mixed or blended. Next, the solvent is removed to provide the foam.

In further embodiments, physical blending devices that can provide dispersive mixing, distributive mixing, or a combination of dispersive and distributive mixing can be used in preparing homogenous blends. Both batch and continuous methods of physical blending can be used. Non-limiting examples of batch methods include those methods using BRABENDER® mixing equipments (e.g., BRABENDER PREP CENTER®, available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the ethylene/α-olefin interpolymer, the optional second polymer component or the foam. The mixing or blending of polymers by extrusion has been described in C. Rauwendaal, *"Polymer Extrusion"*, Hanser Publishers, New York, N.Y., pages 322-334 (1986), which is incorporated herein by reference.

When one or more additives are required in the soft foams, the desired amounts of the additives can be added in one charge or multiple charges to the ethylene/α-olefin interpolymer, the second polymer component or the polymer blend. Furthermore, the addition can take place in any order. In some embodiments, the additives are first added and mixed or blended with the ethylene/α-olefin interpolymer and then the additive-containing interpolymer is blended with the second polymer component. In other embodiments, the additives are first added and mixed or blended with the second polymer component and then the additive-containing second polymer component is blended with the ethylene/α-olefin interpolymer. In further embodiments, the ethylene/α-olefin interpolymer is blended with the second polymer component first and then the additives are blended with the polymer blend.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400-600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001. b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 m/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)):

$M_{polyethylene} = 0.431(M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\epsilon_f$ is the strain taken for cyclic loading and $\epsilon_s$ is the strain where the load returns to the baseline during the $1^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or I2, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers, J. Polyvn. Sci.,* 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL ECLIPSE™ 400 MHz spectrometer or a Varian Unity PLUS™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 µm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 µm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di (t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-(N-(1-methylethyl)immino)methyl)(2-oxoyl)zirconium dibenzyl A solution of (1-methylethyl)(2-hydroxy-3,5-di(t-butyl) phenyl)imine (605 mg, 2.2 mmol) in 5 mL toluene is slowly added to a solution of Zr(CH$_2$Ph)$_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl) (2-oxovl-3,5-di(t-butyl)phenyl)immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of $Zr(CH_2Ph)_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and $Li[B(C_6F_5)_4]$, substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl)zinc (SA3), triethylaluminum (TEA, SA4), trioctylaluminum (SA5), triethylgallium (SA6), i-butylaluminum bis(dimethyl (t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis(t-butyldimethylsiloxide) (SA14), ethylaluminum di(bis (trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide(SA18), ethylzinc (2,6-diphenylphenoxide) (SA19), and ethylzinc (t-butoxide) (SA20).

Examples 1-4, Comparative A-C

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of Example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of Example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of Example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of Example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for Comparative Example A* shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for Comparative Example B* shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for Comparative Example C* shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

Examples 5-19, Comparative Examples D*-F*, Continuous Solution Polymerization, Catalyst A1/B2+DEZ Continuous solution polymerizations are carried out in a computer controlled autoclave reactor equipped with an internal stirrer. Purified mixed alkanes solvent (ISOPAR™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | $C_8H_{16}$ kg/hr | Solv. kg/hr | $H_2$ sccm[1] | T ° C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | $[C_2H_4]/$ $[DEZ]$[4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative Example, not an example of the invention
[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]molar ratio in reactor
[5]polymer production rate
[6]percent ethylene conversion in reactor
[7]efficiency, kg polymer/g M where g M = g Hf + g Zr

TABLE 3

Properties of exemplary polymers

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (° C.) | $T_c$ (° C.) | $T_{CRYSTAF}$ (° C.) | Tm − $T_{CRYSTAF}$ (° C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

*Comparative Example, not an example of the invention

The resulting polymers are tested by DSC and ATREF as with previous examples. Results are as follows:

The DSC curve for the polymer of Example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of Example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of Example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of Example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of Example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of Example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of Example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of Example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of Example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of Example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of Example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of Example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of Example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of Example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of Example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of Comparative Example D* shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of Comparative Example E* shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of Comparative Example F* shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative G* is a substantially linear ethylene/1-octene copolymer (AFFINITY®, available from The Dow Chemical Company), Comparative H* is an elastomeric, substantially linear ethylene/1-octene copolymer (AFFINITY®EG8100, available from The Dow Chemical Company), Comparative Example I* is a substantially linear ethylene/1-octene copolymer (AFFINITY®PL1840, available from The Dow Chemical Company), Comparative Example J* is a hydrogenated styrene/butadiene/styrene triblock copolymer (KRATON™ G1652, available from KRATON Polymers), Comparative Example K* is a thermoplastic vulcanizate (TPV, a polyolefin blend containing dispersed therein a crosslinked elastomer). Results are presented in Table 4.

In Table 4, Comparative Example F* (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative Example J* (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the inventive polymers of 6 or less, whereas a physical blend (Comparative Example F*) has a storage modulus ratio of 9 and a random ethylene/octene copolymer (Comparative Example G*) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparative Examples F* and G* which show considerable blocking. Blocking strength is important since bulk

TABLE 4

High Temperature Mechanical Properties

| Ex. | TMA-1 mm penetration (° C.) | Pellet Blocking Strength lb/ft² (kPa) | G'(25° C.)/ G'(100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 | shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparative Examples F*, G*, H* and J* all have a 70° C. compression set of 100 percent (the maximum possible value, indicating no recovery). Good high temperature compression set (low numerical values) is especially needed for applications such as gaskets, window profiles, o-rings, and the like.

stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative Example G*. Lower stress relaxation means that the polymer retains its force better in applications such as diapers and other garments where retention of elastic properties over long time periods at body temperatures is desired.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm$^3$) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm$_3$, preferably less than about 80 mm$^3$, and especially less than about 50 mm$^3$. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F*, G* and H* have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |

TABLE 6-continued

Polymer Optical Properties

| Ex. | Internal Haze (percent) | Clarity (percent) | 45° Gloss (percent) |
|---|---|---|---|
| H* | 12 | 76 | 59 |
| I* | 20 | 75 | 59 | back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}$C NMR

The optical properties reported in Table 6 are based on compression molded films substantially lacking in orientation. Optical properties of the polymers may be varied over wide ranges, due to variation in crystallite size, resulting from variation the quantity of chain shuttling agent employed in the polymerization.

Extractions of Multi-Block Copolymers

Extraction studies of the polymers of Examples 5, 7 and Comparative Example E* are conducted. In the experiments, the polymer sample is weighed into a glass fitted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred Additional Polymer Examples 19 A-F, Continuous Solution Polymerization, Catalyst A1/B2+DEZ Continuous solution polymerizations are carried out in a computer controlled well-mixed reactor. Purified mixed alkanes solvent (ISOPAR™ E available from ExxonMobil Chemical Company), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

Process details and results are contained in Table 8. Selected polymer properties are provided in Table 9.

TABLE 8

Polymerization Conditions for Polymers 19a-j.

| Ex. | C$_2$H$_4$ lb/hr | C$_8$H$_{16}$ lb/hr | Solv. lb/hr | H$_2$ sccm[1] | T °C. | Cat A1[2] Conc. ppm | Cat A1 lb/hr | Cat B2[3] ppm | Cat B2 lb/hr | DEZ wt % | DEZ lb/hr | Cocat 1 ppm |
|---|---|---|---|---|---|---|---|---|---|---|---|---|
| 19a | 55.29 | 32.03 | 323.03 | 101 | 120 | 600 | 0.25 | 200 | 0.42 | 3.0 | 0.70 | 4500 |
| 19b | 53.95 | 28.96 | 325.3 | 577 | 120 | 600 | 0.25 | 200 | 0.55 | 3.0 | 0.24 | 4500 |
| 19c | 55.53 | 30.97 | 324.37 | 550 | 120 | 600 | 0.216 | 200 | 0.609 | 3.0 | 0.69 | 4500 |
| 19d | 54.83 | 30.58 | 326.33 | 60 | 120 | 600 | 0.22 | 200 | 0.63 | 3.0 | 1.39 | 4500 |
| 19e | 54.95 | 31.73 | 326.75 | 251 | 120 | 600 | 0.21 | 200 | 0.61 | 3.0 | 1.04 | 4500 |
| 19f | 50.43 | 34.80 | 330.33 | 124 | 120 | 600 | 0.20 | 200 | 0.60 | 3.0 | 0.74 | 4500 |
| 19g | 50.25 | 33.08 | 325.61 | 188 | 120 | 600 | 0.19 | 200 | 0.59 | 3.0 | 0.54 | 4500 |
| 19h | 50.15 | 34.87 | 318.17 | 58 | 120 | 600 | 0.21 | 200 | 0.66 | 3.0 | 0.70 | 4500 |
| 19i | 55.02 | 34.02 | 323.59 | 53 | 120 | 600 | 0.44 | 200 | 0.74 | 3.0 | 1.72 | 4500 |
| 19j | 7.46 | 9.04 | 50.6 | 47 | 120 | 150 | 0.22 | 76.7 | 0.36 | 0.5 | 0.19 | — |

| Ex. | Cocat 1 Flow lb/hr | Cocat 2 Conc. ppm | Cocat 2 Flow lb/hr | [Zn][4] in polymer ppm | Poly. Rate[5] lb/hr | Conv[6] wt % | Polymer wt % | Eff.[7] |
|---|---|---|---|---|---|---|---|---|
| 19a | 0.65 | 525 | 0.33 | 248 | 83.94 | 88.0 | 17.28 | 297 |
| 19b | 0.63 | 525 | 0.11 | 90 | 80.72 | 88.1 | 17.2 | 295 |
| 19c | 0.61 | 525 | 0.33 | 246 | 84.13 | 88.9 | 17.16 | 293 |
| 19d | 0.66 | 525 | 0.66 | 491 | 82.56 | 88.1 | 17.07 | 280 |
| 19e | 0.64 | 525 | 0.49 | 368 | 84.11 | 88.4 | 17.43 | 288 |
| 19f | 0.52 | 525 | 0.35 | 257 | 85.31 | 87.5 | 17.09 | 319 |
| 19g | 0.51 | 525 | 0.16 | 194 | 83.72 | 87.5 | 17.34 | 333 |
| 19h | 0.52 | 525 | 0.70 | 259 | 83.21 | 88.0 | 17.46 | 312 |
| 19i | 0.70 | 525 | 1.65 | 600 | 86.63 | 88.0 | 17.6 | 275 |
| 19j | — | — | — | — | — | — | — | — |

[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dimethyl
[4]ppm in final product calculated by mass balance
[5]polymer production rate
[6]weight percent ethylene conversion in reactor
[7]efficiency, kg polymer/g M where g M = g Hf + g Z

TABLE 9

Polymer Physical properties

| Polymer Ex. No. | Density (g/cc) | I$_2$ | I$_{10}$ | I$_{10}$/I$_2$ | Mw (g/mol) | Mn (g/mol) | M$_w$/M$_n$ | Heat of Fusion (J/g) | T$_m$ (°C.) | T$_c$ (°C.) | TCRYSTAF (°C.) | Tm − TCRYSTAF (°C.) | CRYSTAF Peak Area (wt %) |
|---|---|---|---|---|---|---|---|---|---|---|---|---|---|
| 19g | 0.8649 | 0.9 | 6.4 | 7.1 | 135000 | 64800 | 2.1 | 26 | 120 | 92 | 30 | 90 | 90 |
| 19h | 0.8654 | 1.0 | 7.0 | 7.1 | 131600 | 66900 | 2.0 | 26 | 118 | 88 | — | — | — |
| 19k[1] | 0.8652 | 1.1 | 7.5 | 6.8 | 124900 | 60700 | 2.1 | 27 | 119 | 88 | 30 | 89 | 89.3 |
| 19l[1] | 0.892 | 1.1 | 7.7 | 6.8 | 93000 | 45500 | 2.0 | 84 | 120 | 101 | — | — | — |

Note:
[1]Polymer Examples 19k and 19l were copolymers of ethylene and octene which were prepared substantially similar to Examples 1-19 and Examples 19a-h and according to the conditions shown in Table 10 below.

TABLE 9A

Average Block Index For exemplary polymers[1]

| Example | Zn/$C_2$[2] | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1]Additional information regarding the calculation of the block indices for various polymers is disclosed in U.S. patent application Ser. No. 11/376,835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein
[2]Zn/$C_2$ * 1000 = (Zn feed flow * Zn concentration/1000000/Mw of Zn)/(Total Ethylene feed flow * (1 − fractional ethylene conversion rate)/Mw of Ethylene) * 1000. Please note that "Zn" in "Zn/$C_2$ * 1000" refers to the amount of zinc in diethyl zinc ("DEZ") used in the polymerization process, and "C2" refers to the amount of ethylene used in the polymerization process.

TABLE 10

Polymerization Conditions for Polymers 19k-l.

| Ex. | $C_8H_{16}$ kg/hr | Solv. kg/hr | $H_2$ sccm[1] | T °C. | Cat A1[2] Conc. ppm | Cat A1 Flow kg/hr | Cat B2[3] Conc. ppm | Cat B2 Flow kg/hr | DEZ Conc % | DEZ Flow kg/hr | Cocat Conc. ppm | Cocat Flow kg/hr | [Zn][4] in polymer ppm | Poly Rate[5] kg/hr | Conv.[6] wt % | Polymer w % | Eff.[7] |
|---|---|---|---|---|---|---|---|---|---|---|---|---|---|---|---|---|---|
| 19k | 15.79 | 149.88 | 124 | 120 | 600 | 0.09 | 200 | 0.27 | 3 | 0.34 | 4500 | 0.24 | 257 | 38.71 | 87.5 | 17.09 | 319 |
| 19l | 10.08 | 174.57 | 82 | 120 | 600 | 0.42 | 200 | 0.28 | 3 | 0.39 | 4500 | 0.39 | 335 | 34.18 | 88.7 | 14.28 | 223 |

[1]standard $cm^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dimethyl
[4]ppm in final product calculated by mass balance
[5]polymer production rate
[6]weight percent ethylene conversion in reactor
[7]efficiency, kg polymer/g M where g M = g Hf + g Z Comparative Examples L-S and Examples 20-40

The foaming temperature disclosed herein, unless otherwise stated, is the optimal gel temperature for foaming when the melt strength is high enough to stabilize the foam and prevent cell collapse.

The foaming window disclosed herein, unless otherwise stated, is the temperature range of the polymer/blowing agent mixture exiting the die that provides stable foam with the lowest density and open cell content. Above this temperature range, the foam is unstable and collapses and below this temperature range the polymer freezes and crystallizes out of the melt.

Comparative Example L was a foam prepared from a mixture of 100 parts by weight of LDPE 620i (a low density polyethylene from The Dow Chemical Company, Midland, Mich.), 10 parts by weight of isobutane, 1.5 parts by weight of HYDROCEROL® CF 20 (a nucleating agent from Clariant Corporation, Charlotte, N.C.), 0.2 parts by weight of IRGA-NOX™ 1010 (an antioxidant from Ciba Geigy, N.Y.) and 1 part by weight of gycerol monostearate. The mixture was converted into a foam plank using a single barrier screw foaming line having a 40 lbs/hr (i.e., 18.1 Kg/hr) capacity. The 40 lb/hr extrusion line consisted of a 1.75 inches (i.e., 4.445 cm) single screw extruder (LID: 30:1) with a feeding zone for resins and solid additives, a melting zone, and a metering zone. In addition, there were a mixing zone with a port for injecting blowing agents and liquid additives and a cooling zone to uniformly cool the melt to the foaming temperature. The line also consisted of a gear pump between the metering and mixing zones to stabilize the melt flow and a static mixer in the cooling zone to improve gel temperature uniformity. The melt was extruded through a ½ inch (i.e., 1.27 cm) slit die to ambient temperature and pressure. The melt or gel was allowed to expand to the desired shape. The residence time was 18 minutes. The foaming line was equipped with cooling front end to lower melt temperature to 105-110° C. The ½ inch slit die was used to control the cross-section of the foam plank to about/½inch×3 inches (i.e., 1.27 cm×7.62 cm). The foaming range was between 106 and 112° C. The freeze-off was at 104-105° C. The foaming window was measured starting at about 112° C. and the foaming temperature was reduced in 1° C. steps until the foam density increased. The density and open cell content of the extruded foam were recorded in every 1° C. step.

Comparative Example M was a foam prepared similarly according to the procedure for Comparative Example L except that 30 wt % of LDPE 620i was replaced with AFFINITY® 1880 (a polyolefin plastomer from The Dow Chemical Company, Midland, Mich.). Comparative Example N was a foam prepared similarly according to the procedure for Comparative Example L except that 40 wt % of LDPE 620i was replaced with AFFINITY® 1880 (a polyolefin plastomer from The Dow Chemical Company, Midland, Mich.). Comparative Example O was a foam prepared similarly according to the procedure for Comparative Example L except that 50 wt % of LDPE 620i was replaced with AFFINITY® 1880 (a polyolefin plastomer from The Dow Chemical Company, Midland, Mich.).

Example 20 was a foam prepared similarly according to the procedure for Comparative Example 1 except that 30 wt % of LDPE 620i was replaced with Example 19k. Example 21 was a foam prepared similarly according to the procedure for Comparative Example L except that 50 wt % of LDPE 620i was replaced with Example 19k. Example 22 was a foam prepared similarly according to the procedure for Comparative Example L except that 70 wt % of LDPE 620i was replaced with Example 19k.

Example 23 was a foam prepared similarly according to the procedure for Comparative Example L except that 30 wt % of LDPE 620i was replaced with Example 19a. Example 23P was a foam prepared similarly according to the procedure for Example 23 except that LDPE 620i and Example 19a was preblended. The polymer blend was compounded at 190° C. for 10 minutes on a Werner Pfleiderer ZSK-30 twin screw compounder (L/D 1:30) at 50 lb/hr with a 10 min residence time. The extruded polymer strands were cooled under water and air dried and pelletized with a Conair pelletizer. Example 24 was a foam prepared similarly according to the procedure for Comparative Example L except that 50 wt % of LDPE 620i was replaced with Example 19a. Example 25 was a foam prepared similarly according to the procedure for Comparative Example L except that 70 wt % of LDPE 620i was replaced with Example 19a. Example 26 was a foam prepared similarly according to the procedure for Comparative Example L except that 100 wt % of LDPE 620i was replaced with Example 19a.

Example 27 was a foam prepared similarly according to the procedure for Comparative Example L except that 30 wt % of LDPE 620i was replaced with Example 19b. Example 28 was a foam prepared similarly according to the procedure for Comparative Example L except that 50 wt % of LDPE 620i was replaced with Example 19b. Example 29 was a foam prepared similarly according to the procedure for Comparative Example L except that 70 wt % of LDPE 620i was replaced with Example 19b.

Example 30 was a foam prepared similarly according to the procedure for Comparative Example L except that 30 wt % of LDPE 620i was replaced with Example 19l. Example 31 was a foam prepared similarly according to the procedure for Comparative Example L except that 50 wt % of LDPE 620i was replaced with Example 19l. Example 32 was a foam prepared similarly according to the procedure for Comparative Example L except that 70 wt % of LDPE 620i was replaced with Example 19l. Example 33 was a foam prepared similarly according to the procedure for Comparative Example L except that 100 wt % of LDPE 620i was replaced with Example 19l.

Comparative Example P was a foam prepared similarly according to the procedure for Comparative Example L except that the chemical ingredients were replaced with 100 parts by weight of PROFAX® PF 814 (a HMS PP from Montell Polyolefins, Wilmington, Del.), 6 parts by weight of isobutane, 0.5 parts by weight of talc, 0.5 parts by weight of IRGANOX™ 1010 (an antioxidant from Ciba Geigy, New York) and 0.5 part by weight of calcium stearate.

Example 34 was a foam prepared similarly according to the procedure for Comparative Example P except that 30 wt % of PROFAX® PF 814 was replaced with Example 19k. Example 35 was a foam prepared similarly according to the procedure for Comparative Example P except that 50 wt % of PROFAX® PF 814 was replaced with Example 19k. Example 36 was a foam prepared similarly according to the procedure for Comparative Example P except that 70 wt % of PROFAX® PF 814 was replaced with Example 19k. Example 37 was a foam prepared similarly according to the procedure for Comparative Example P except that 30 wt % of PROFAX® PF 814 was replaced with Example 19a. Example 38 was a foam prepared similarly according to the procedure for Comparative Example P except that 50 wt % of PROFAX® PF 814 was replaced with Example 19a. Example 39 was a foam prepared similarly according to the procedure for Comparative Example P except that 30 wt % of PROFAX® PF 814 was replaced with Example 19a. Example 40 was a foam prepared similarly according to the procedure for Comparative Example P except that 50 wt % of PROFAX® PF 814 was replaced with Example 19a. Example 41 was a foam prepared similarly according to the procedure for Comparative Example P except that 30 wt % of PROFAX® PF 814 was replaced with Example 19l. Example 42 was a foam prepared similarly according to the procedure for Comparative Example P except that 50 wt % of PROFAX® PF 814 was replaced with Example 19l.

Comparative Example Q was a foam prepared similarly according to the procedure for Comparative Example P except that 30 wt % of PROFAX® PF 814 was replaced with AFFINITY® 8100 (a polyolefin plastomer from The Dow Chemical Company, Midland, Mich.). Comparative Example R was a foam prepared similarly according to the procedure for Comparative Example P except that 50 wt % of PROFAX® PF 814 was replaced with AFFINITY® 8100. Comparative Example S was a foam prepared similarly according to the procedure for Comparative Example P except that 70 wt % of PROFAX® PF 814 was replaced with AFFINITY® 8100. Comparative Example U was a foam prepared similarly according to the procedure for Comparative Example P except that 30 wt % of PROFAX® PF 814 was replaced with VERSIFY® DE 2300 (a propylene-ethylene copolymers from The Dow Chemical Company, Midland, Mich.). Comparative Example V was a foam prepared similarly according to the procedure for Comparative Example P except that 50 wt % of PROFAX® PF 814 was replaced with VERSIFY® DE 2300.

Measurements of Foam Properties

Figure 8:
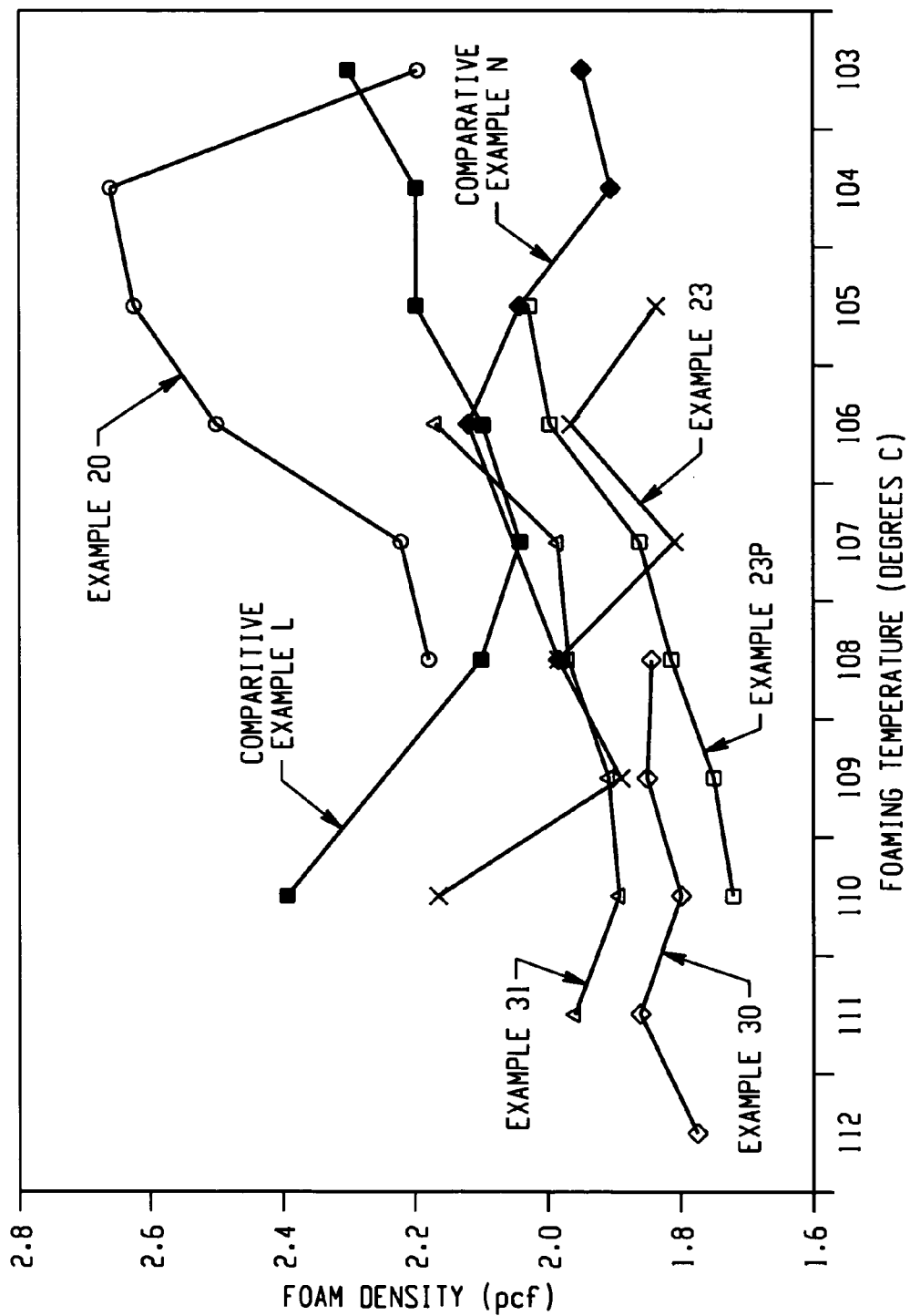
FIG. 8 shows the foam densities of Example 20 (represented by the open circles), Example 23 (represented by the "X" symbols), Example 23P (represented by the open squares), Example 30 (represented by the open diamonds), Example 31 (represented by the open triangles), Comparative Example L (represented by the solid squares), and Comparative Example N (represented by the solid diamonds), as a function of foaming temperature.

The foam densities of Examples 20, 23, 23P, 30 and 31, and Comparative Examples L and N were measured according to ASTM D3575-00 Suffix W, which is incorporated herein by reference. The foam densities of the foam examples are shown in FIG. 8 and Table 13.

Figure 9:
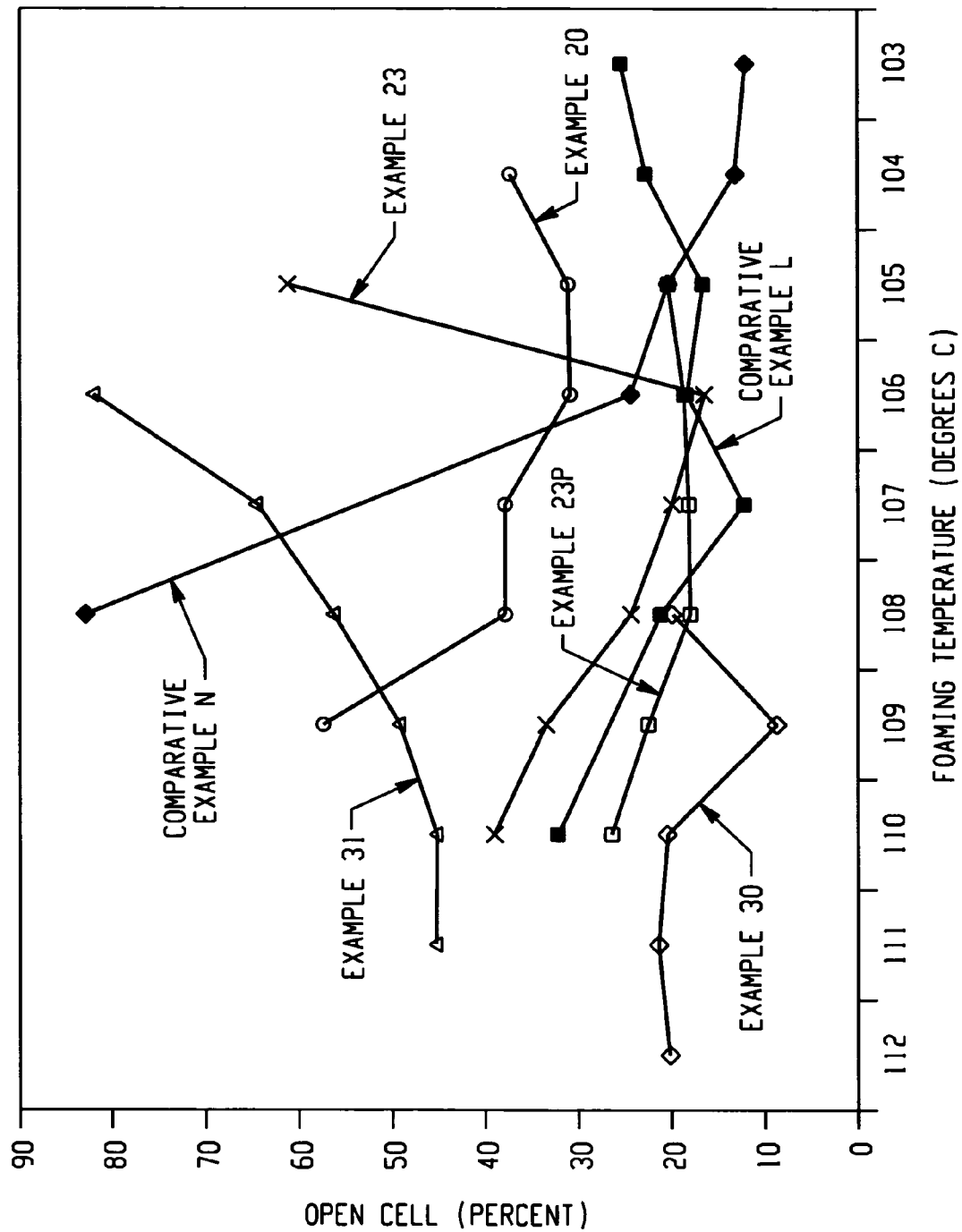
FIG. 9 shows the percentages of open cell of Example 20 (represented by the open circles), Example 23 (represented by the "X" symbols), Example 23P (represented by the open squares), Example 30 (represented by the open diamonds), Example 31 (represented by the open triangles), Comparative Example L (represented by the solid squares), and Comparative Example N (represented by the solid diamonds), as a function of foaming temperature.
Figure 23:
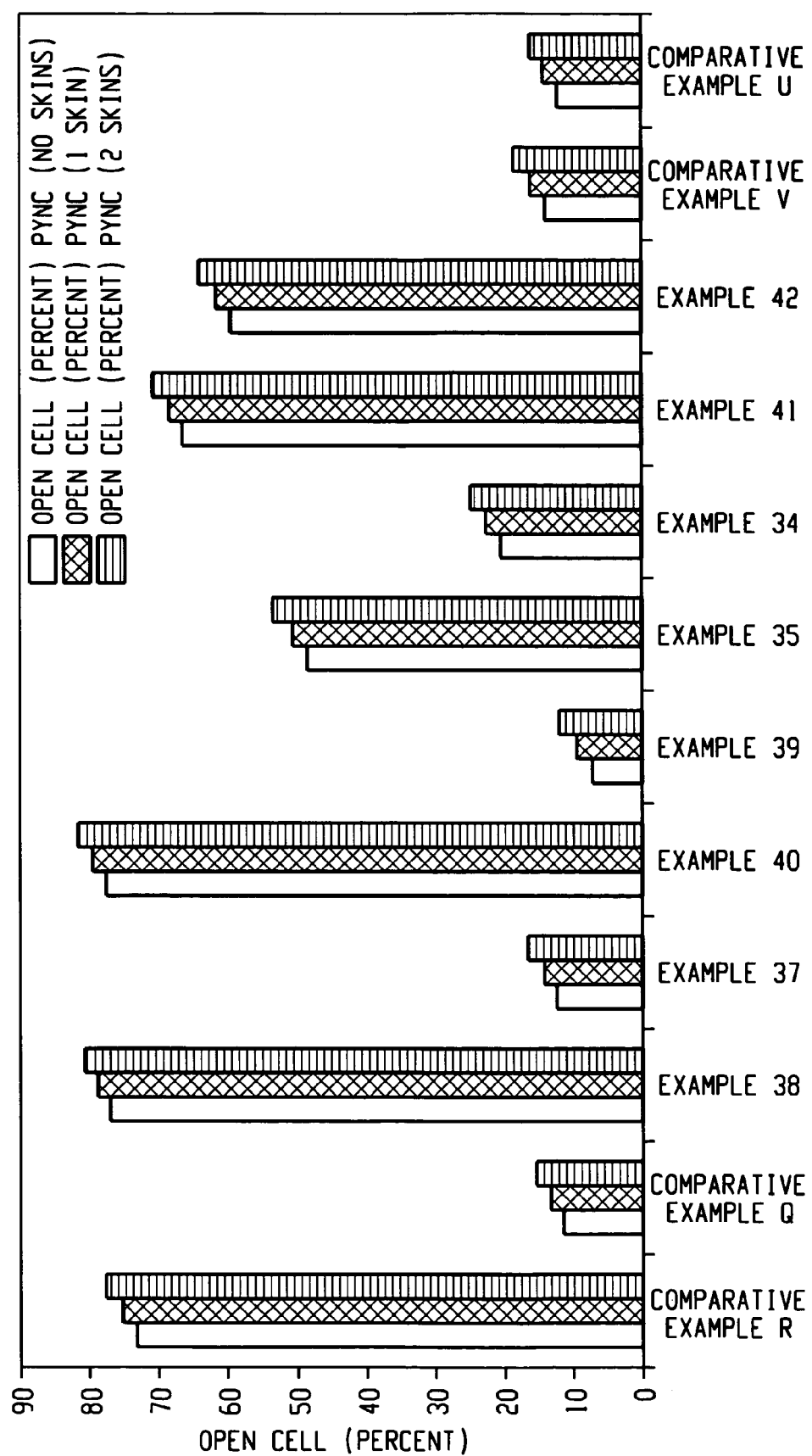
FIG. 23 shows the percentages of open cell of Examples 34-35 and 37-42, and Comparatives Examples Q, R, U and V with no skin, 1 skin and 2 skins respectively.

The percentages of open cell of Examples 20, 23, 23P, 30, 31, 34-35 and 37-42 and Comparative Examples L, N, Q, R, U and V were measured according to ASTM D2856-94 (1998), which is incorporated herein by reference. The percentages of open cell of the foam examples are shown in FIGS. 9 and 23 and Table 13.

Figure 10:
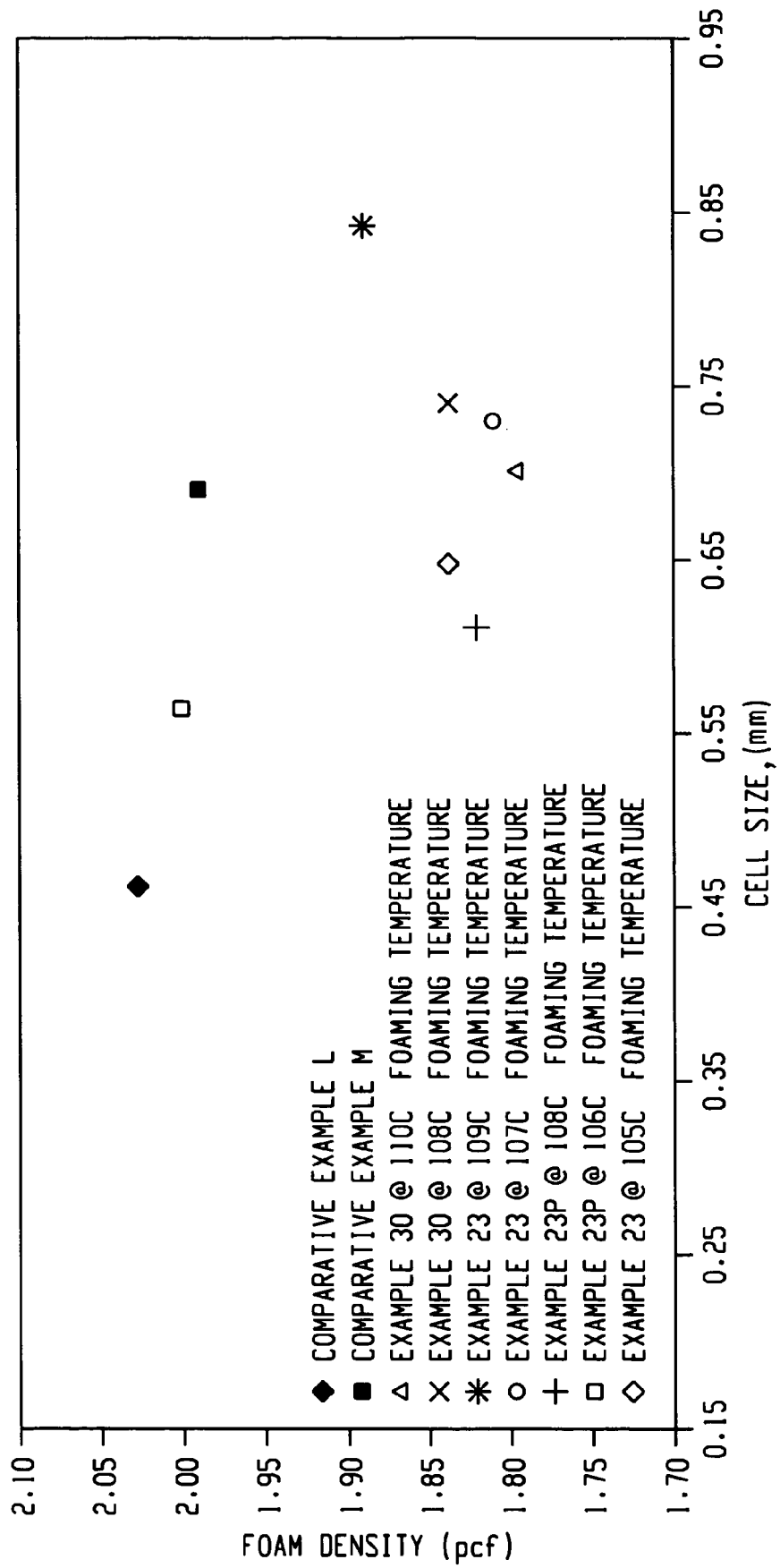
FIG. 10 shows plots of cell size versus foam density for Example 23 prepared at 105° C. (represented by the open diamond), 107° C. (represented by the open circle) and 109° C. (represented by the "*" symbol) foaming temperatures respectively, Example 23P prepared at 106° C. (represented by the open square) and 108° C. (represented by the "+" symbol) foaming temperatures respectively, Example 30 prepared at 108° C. (represented by the "X" symbol) and 110° C. (represented by the open triangle) foaming temperatures respectively, Comparative Example L (represented by the solid diamond), and Comparative Example N (represented by the solid square).

The cell sizes of Examples 23, 23P and 30, and Comparative Examples L and M were measured according to FP-156, which is incorporated herein by reference. The cell sizes of the foam examples are shown in FIG. 10 and in Table 12.

Figure 11:
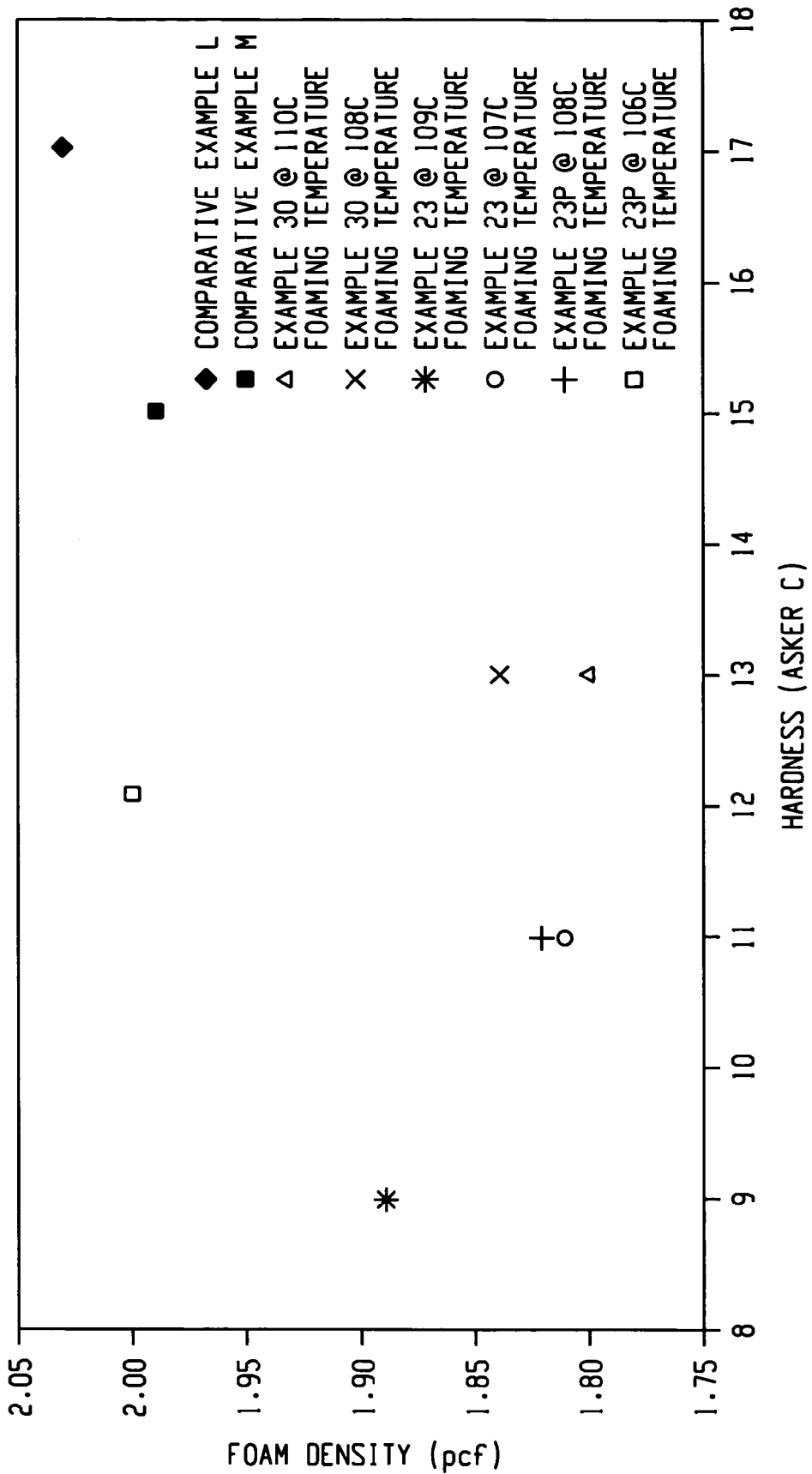
FIG. 11 shows plots of Asker C hardness versus foam density for Example 23 prepared at 107° C. (represented by the open circle) and 109° C. (represented by the "*" symbol) foaming temperatures respectively, Example 23P prepared at 106° C. (represented by the open square) and 108° C. (represented by the "+" symbol) foaming temperatures respectively, Example 30 prepared at 108° C. (represented by the "X" symbol) and 110° C. (represented by the open triangle) foaming temperatures respectively, Comparative Example L (represented by the solid diamond), and Comparative Example N (represented by the solid square).

The Asker C hardness of Examples 23, 23P and 30, and Comparative Examples L and M were measured with an Asker Type C Style Durometer according to standard industry procedure. The Asker C hardness results of the foam examples are shown in FIG. 11.

Figure 12:
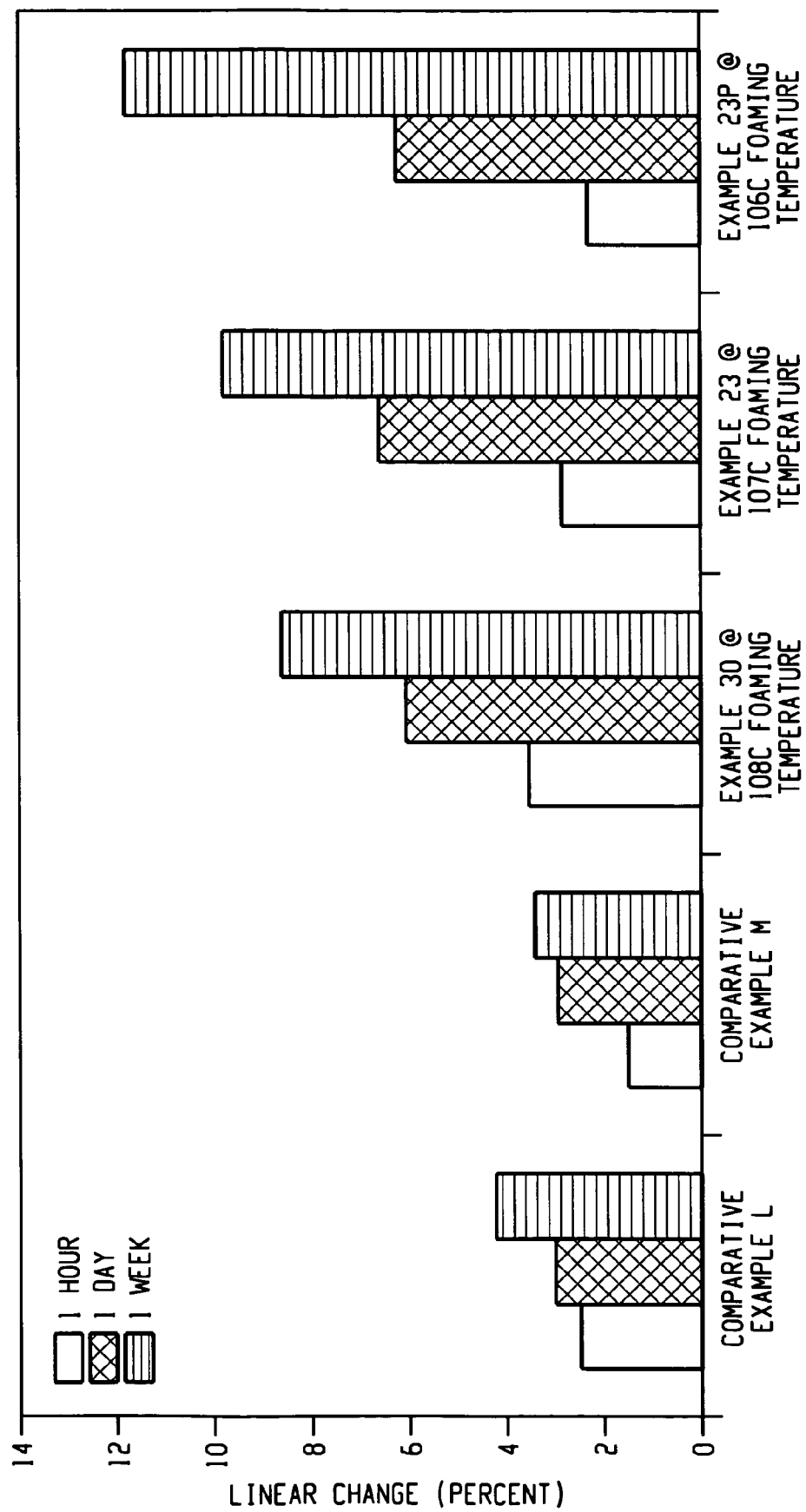
FIG. 12 shows the vertical compression creep results of Example 23 prepared at 107° C. foaming temperature, Example 23P prepared at 106° C. foaming temperature, Example 30 prepared at 108° C. foaming temperature, Comparative Example L and Comparative Example N after 1 hour, 1 day and 1 week respectively.
Figure 20:
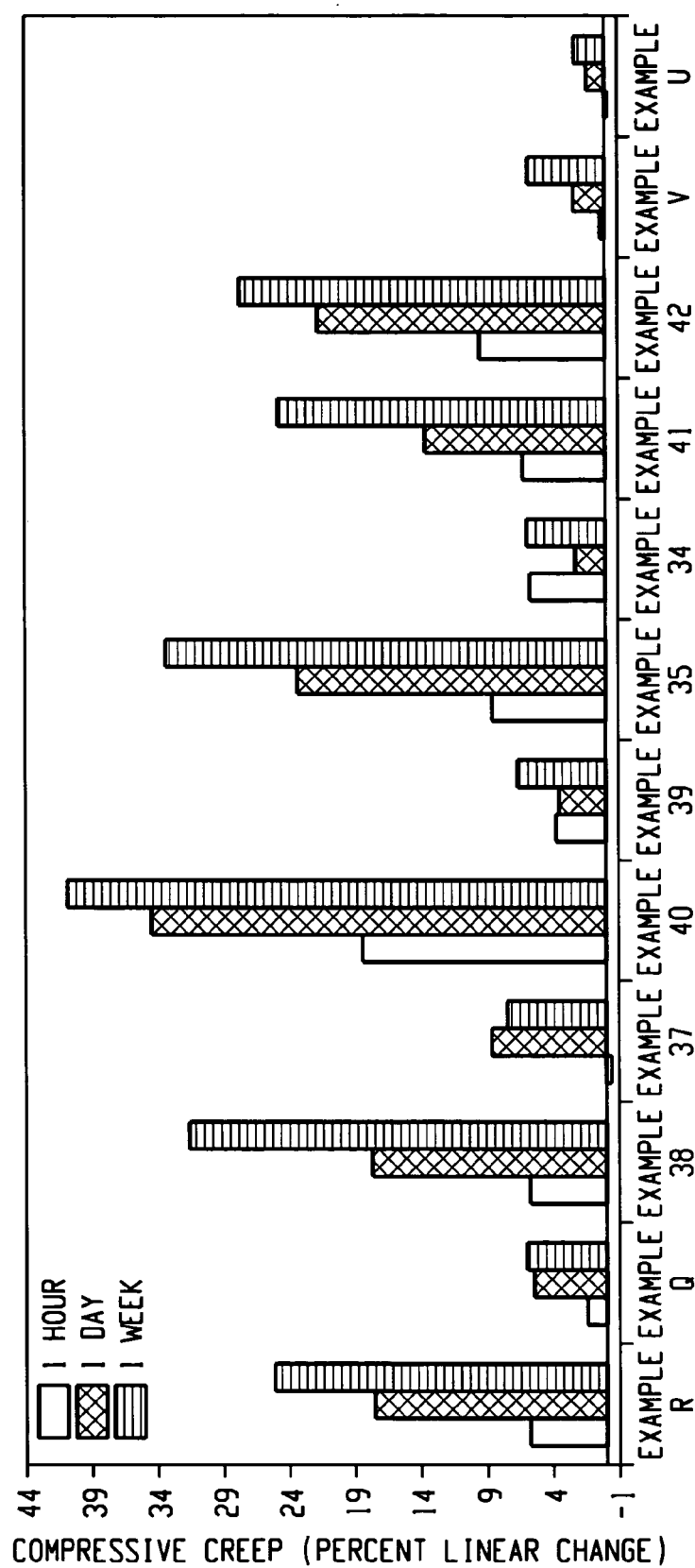
FIG. 20 shows the vertical compression creep results of Examples 34-35 and 37-42, and Comparatives Examples Q, R, U and V at 1 hour, 1 day and 1 week respectively.

The compression creep of Examples 23, 23P, 30, 34-35 and 37-42, and Comparative Examples L, M, Q, R, U and V were measured according to ASTM D 3575-00 Suffix B, which is incorporated herein by reference. The compression creep results of the foam examples are shown in FIGS. 12 and 20.

Figure 13:
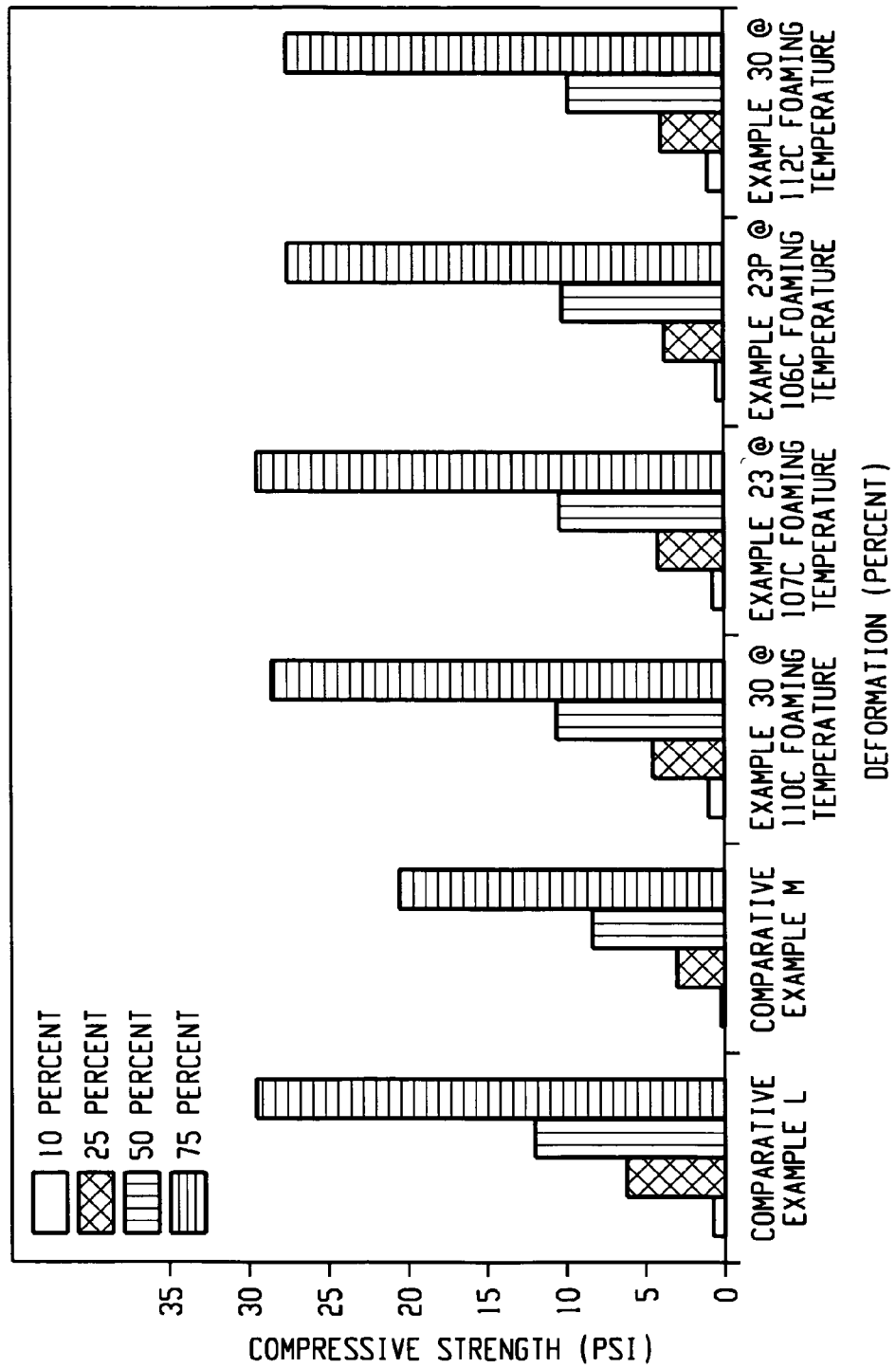
FIG. 13 shows the vertical compression deflection results of Example 23 prepared at 107° C. foaming temperature, Example 23P prepared at 106° C. foaming temperature, Example 30 prepared at 110° C. and 112° C. foaming temperatures respectively, Comparative Example L and Comparative Example N at 10%, 25%, 50% and 75% deformation respectively.
Figure 21:
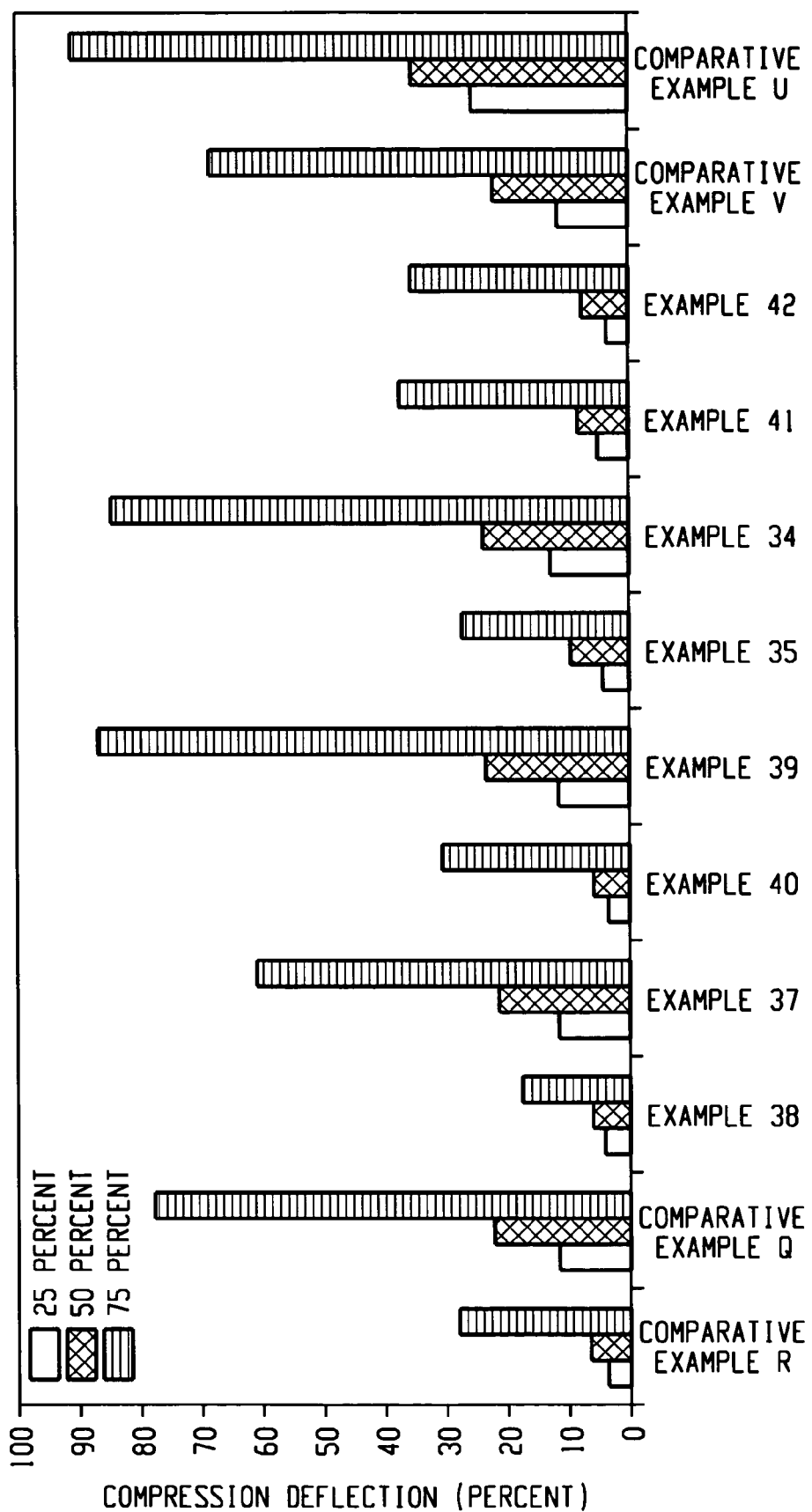
FIG. 21 shows the vertical compression deflection results of Examples 34-35 and 37-42, and Comparatives Examples Q, R, U and V at 25%, 50% and 75% deformation respectively.
Figure 22:
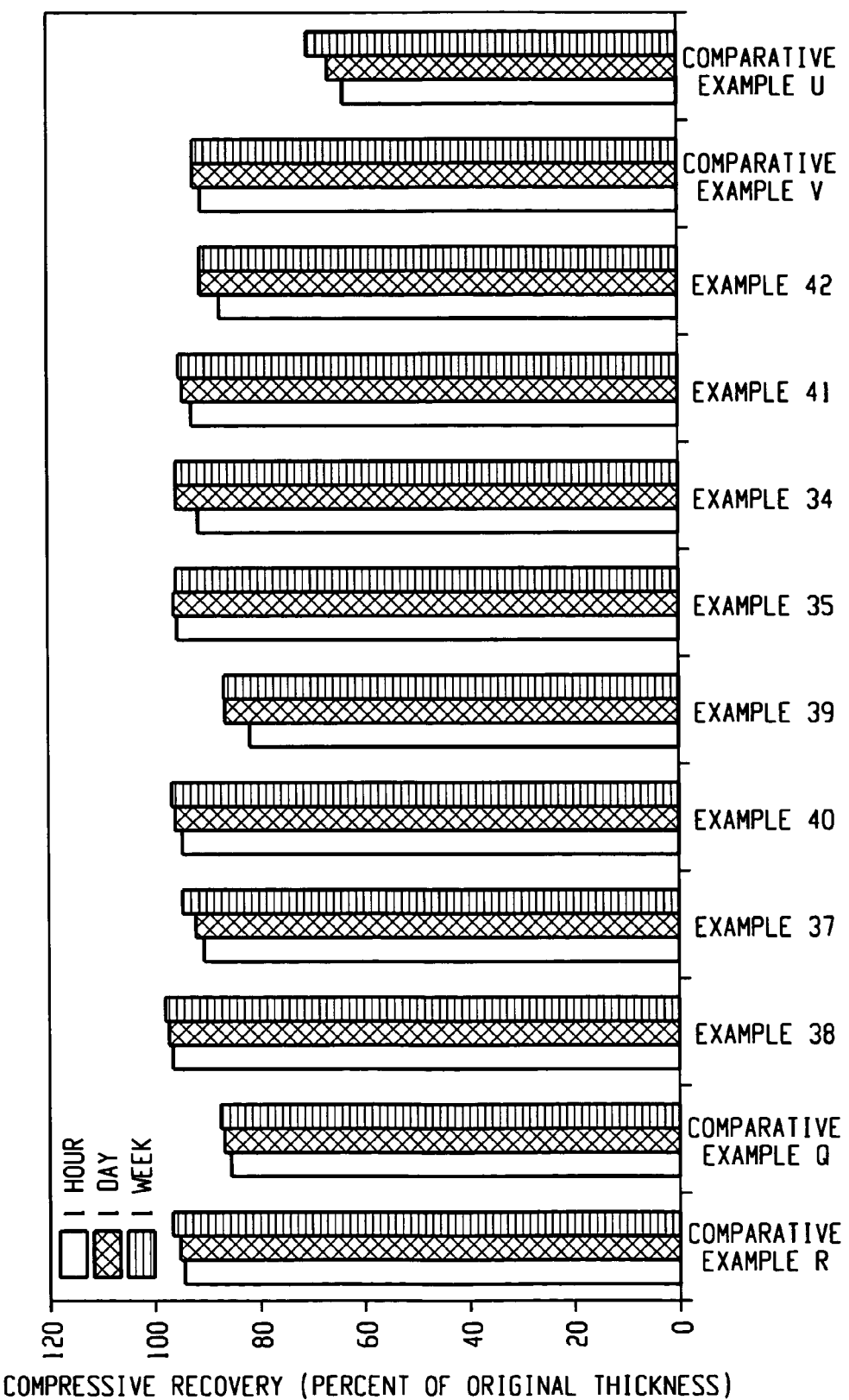
FIG. 22 shows the compression recovery results of Examples 34-35 and 37-42, and Comparatives Examples Q, R, U and V at 1 hour, 1 day and 1 week respectively.

The compression deflection of Examples 23, 23P, 30, 34-35 and 37-42, and Comparative Examples L, M, Q, R, U and V were measured according to ASTM D 3575-00 Suffix D, which is incorporated herein by reference. The compression deflection results of the foam examples are shown in FIGS. 13 and 21. After the test, the compression recovery of Examples 34-35 and 37-42, and Comparatives Examples Q, R, U and V were measured after 1 hour, 1 day, 1 week, and up to 4 weeks. The compression recovery results of Examples 34-35 and 37-42, and Comparatives Examples Q, R, U and V are shown in FIG. 22.

The compression set of Examples 23, 23P, 30, 34-35 and 37-42, and Comparative Examples L, M, Q, R, U and V were measured according to CID A-A-59136 (1997), which is incorporated herein by reference. The compression set results of the foam examples are shown in FIGS. 17, 18, 26 and 27.

Figure 14:
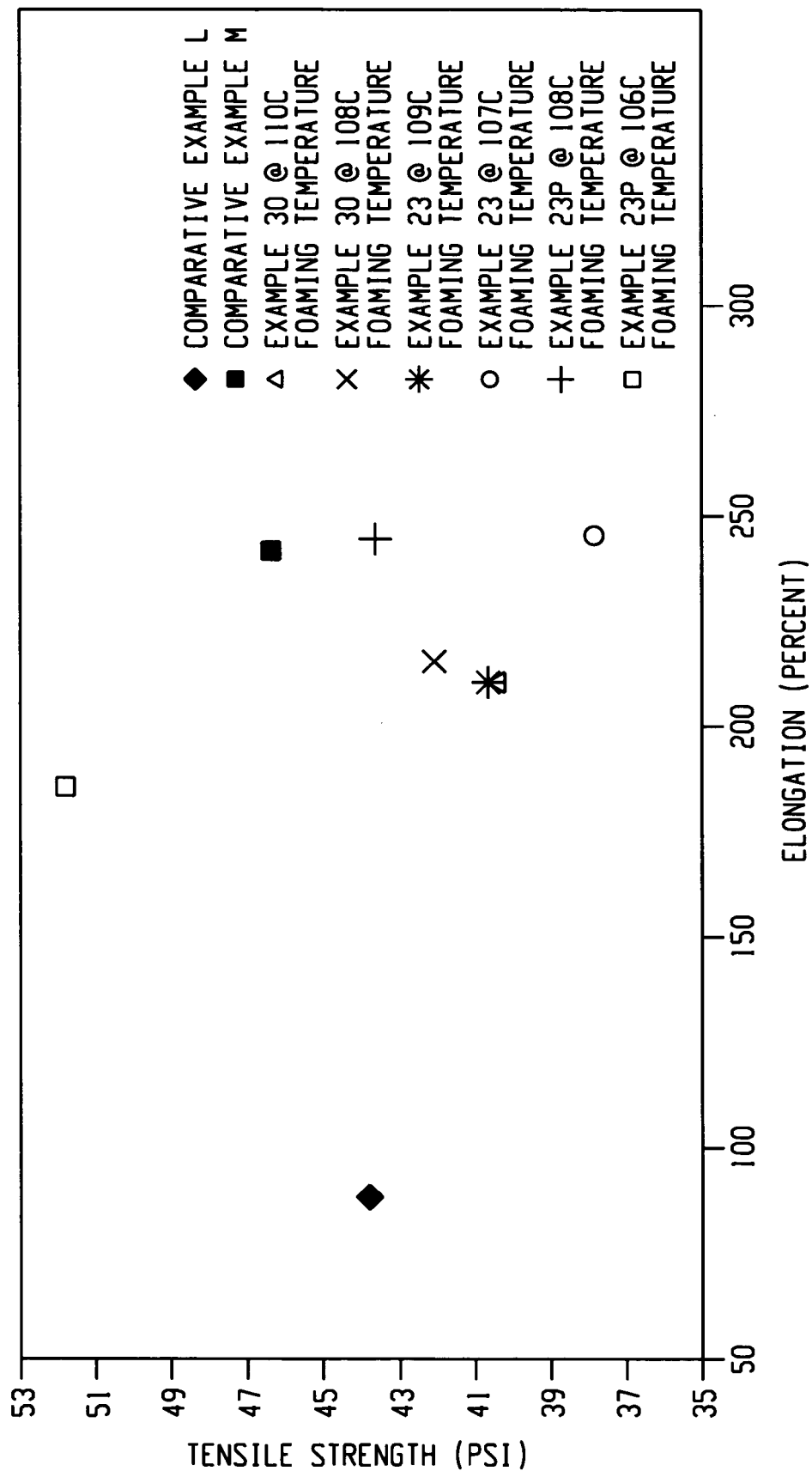
FIG. 14 shows the tensile strength at break results of Example 23 prepared at 107° C. (represented by the open circle) and 109° C. (represented by the "*" symbol) foaming temperatures respectively, Example 23P prepared at 106° C. (represented by the open square) and 108° C. (represented by the "+" symbol) foaming temperatures respectively, Example 30 prepared at 108° C. (represented by the "X" symbol) and 110° C. (represented by the open triangle) foaming temperatures respectively, Comparative Example L (represented by the solid diamond), and Comparative Example N (represented by the solid square).
Figure 25:
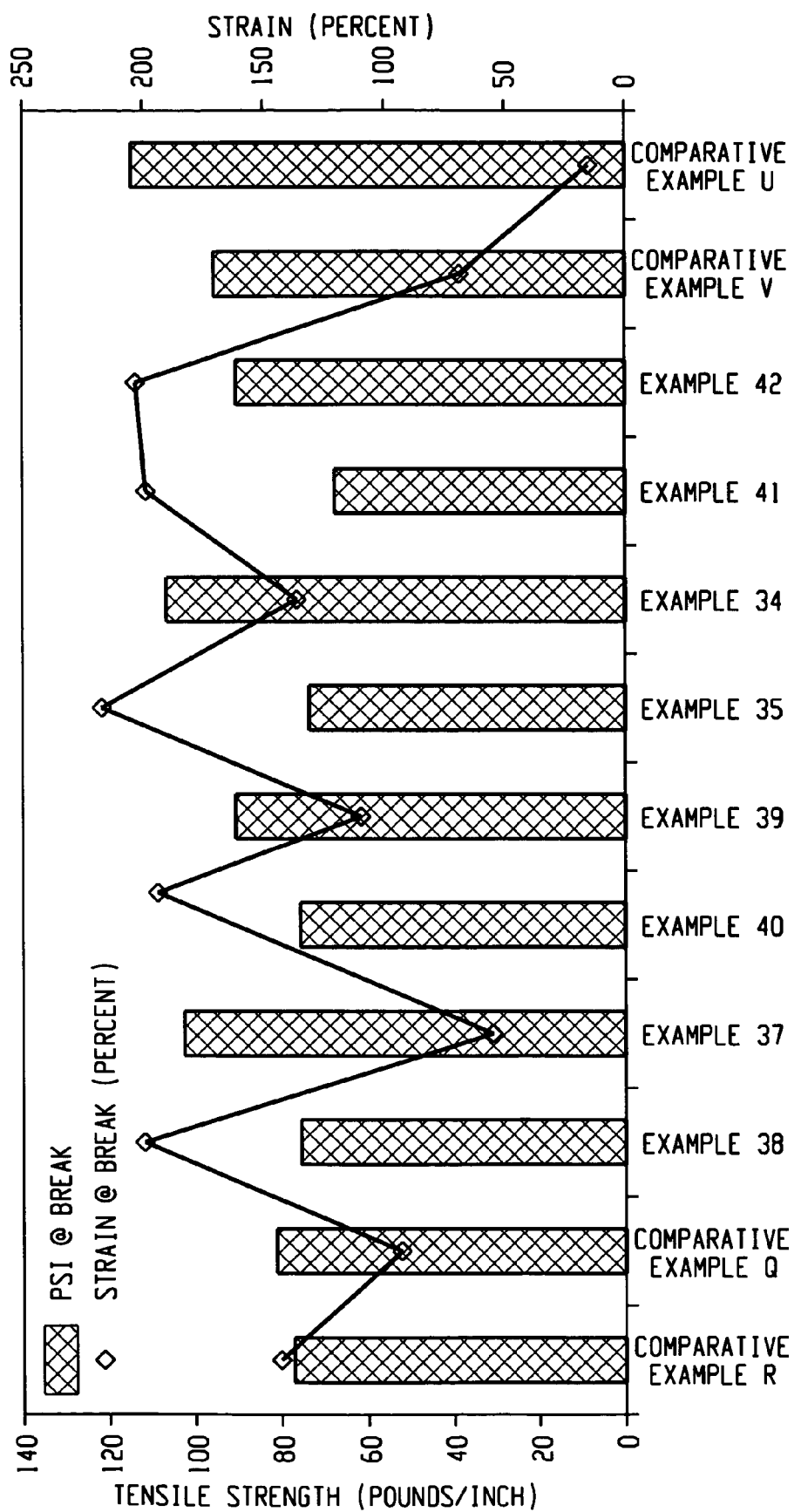
FIG. 25 shows the tensile strength and strain at break results of Examples 34-35 and 37-42, and Comparatives Examples Q, R, U and V.
Figure 26:
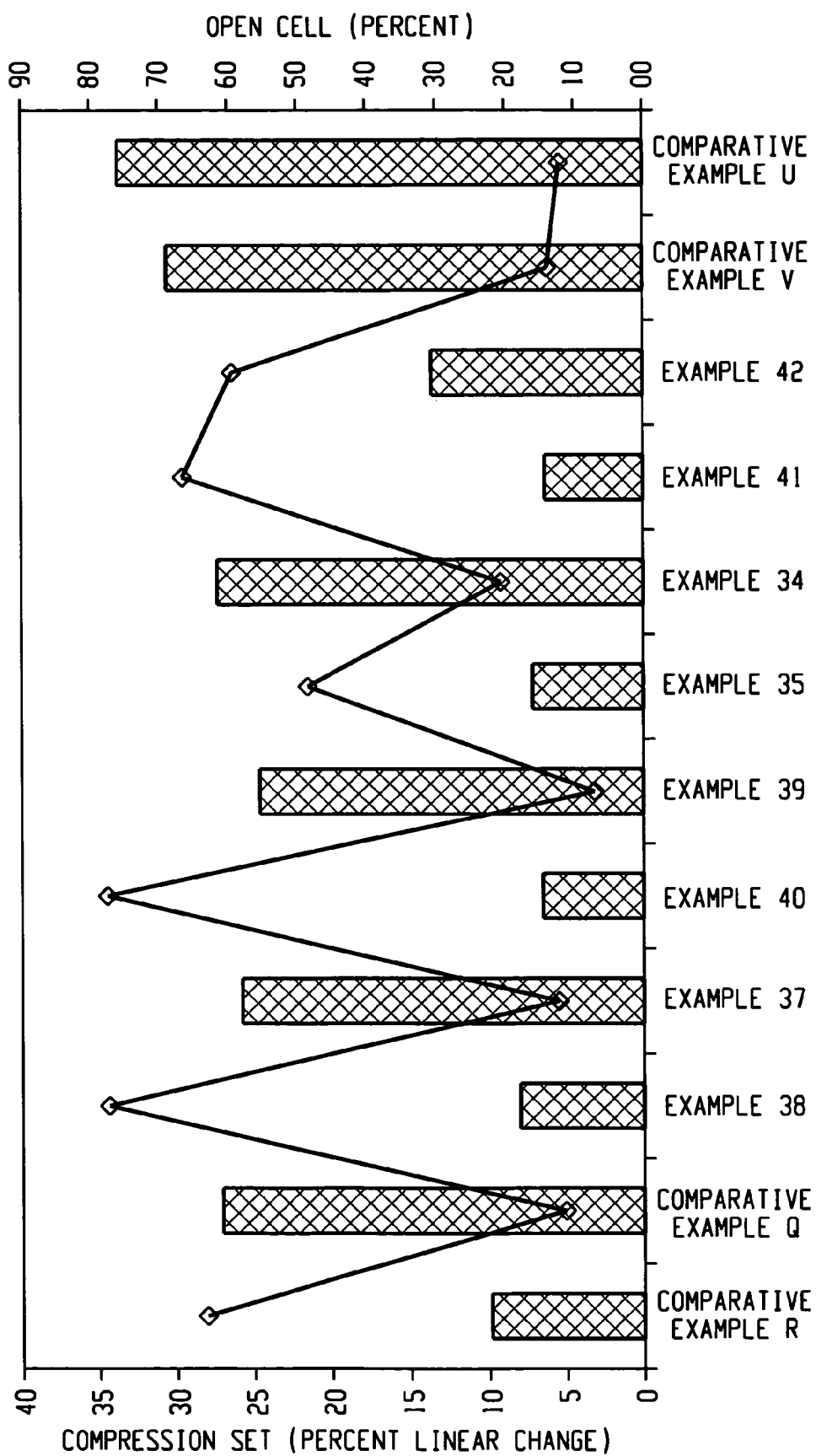
FIG. 26 shows plots of compression set and % of open cell for Examples 34-35 and 37-42, and Comparatives Examples Q, R, U and V.
Figure 27:
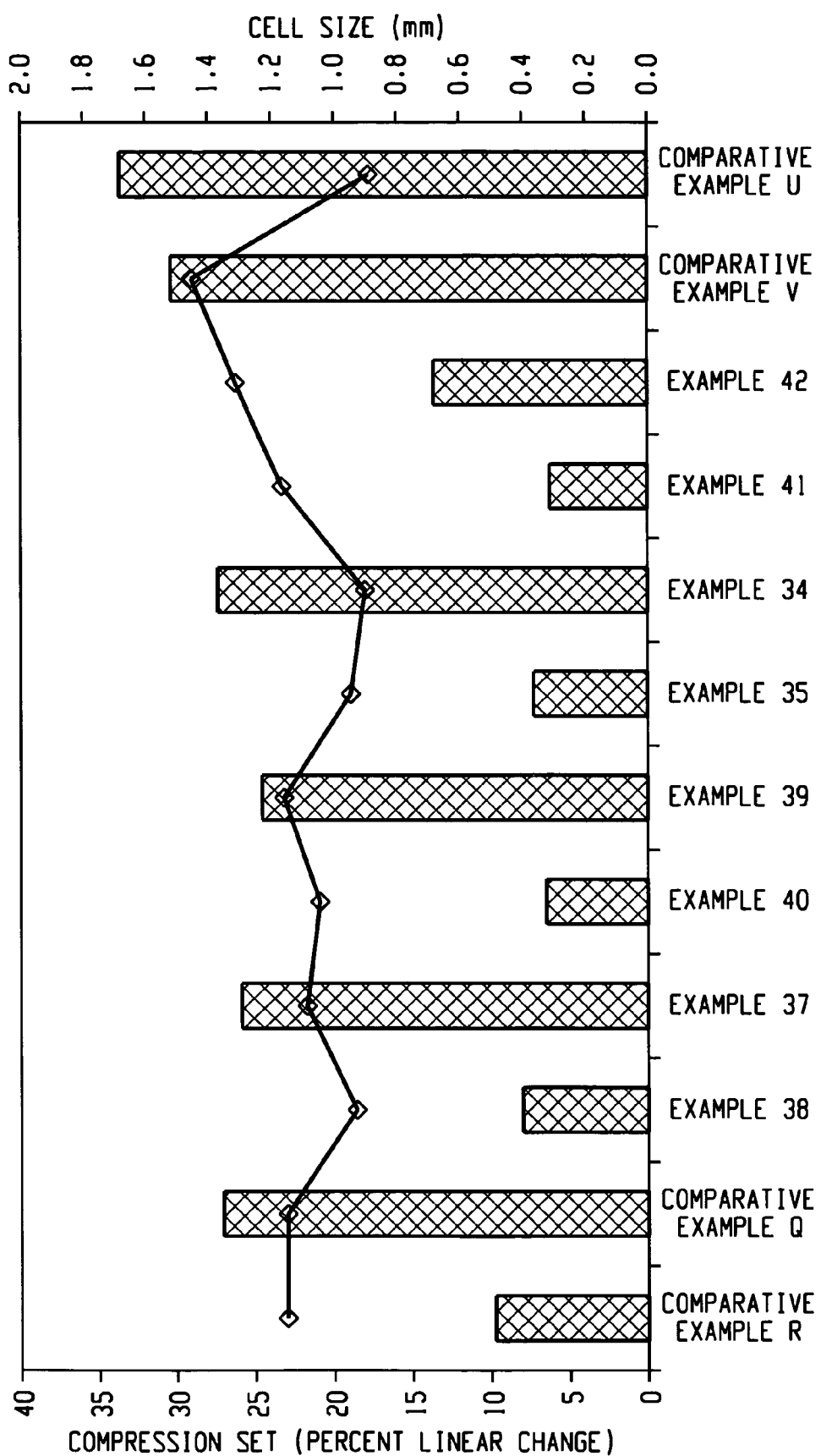
FIG. 27 shows plots of compression set and cell size for Examples 34-35 and 37-42, and Comparatives Examples Q, R, U and V.

The tensile strength and elongation of Examples 23, 23P, 30, 34-35 and 37-42, and Comparative Examples L, M, Q, R, U and V were measured according to ASTM D 412-98 per ASTM D3575 Suffix T, which is incorporated herein by reference. The tensile strength and elongation results of the foam examples are shown in FIGS. 14 and 25.

Figure 15:
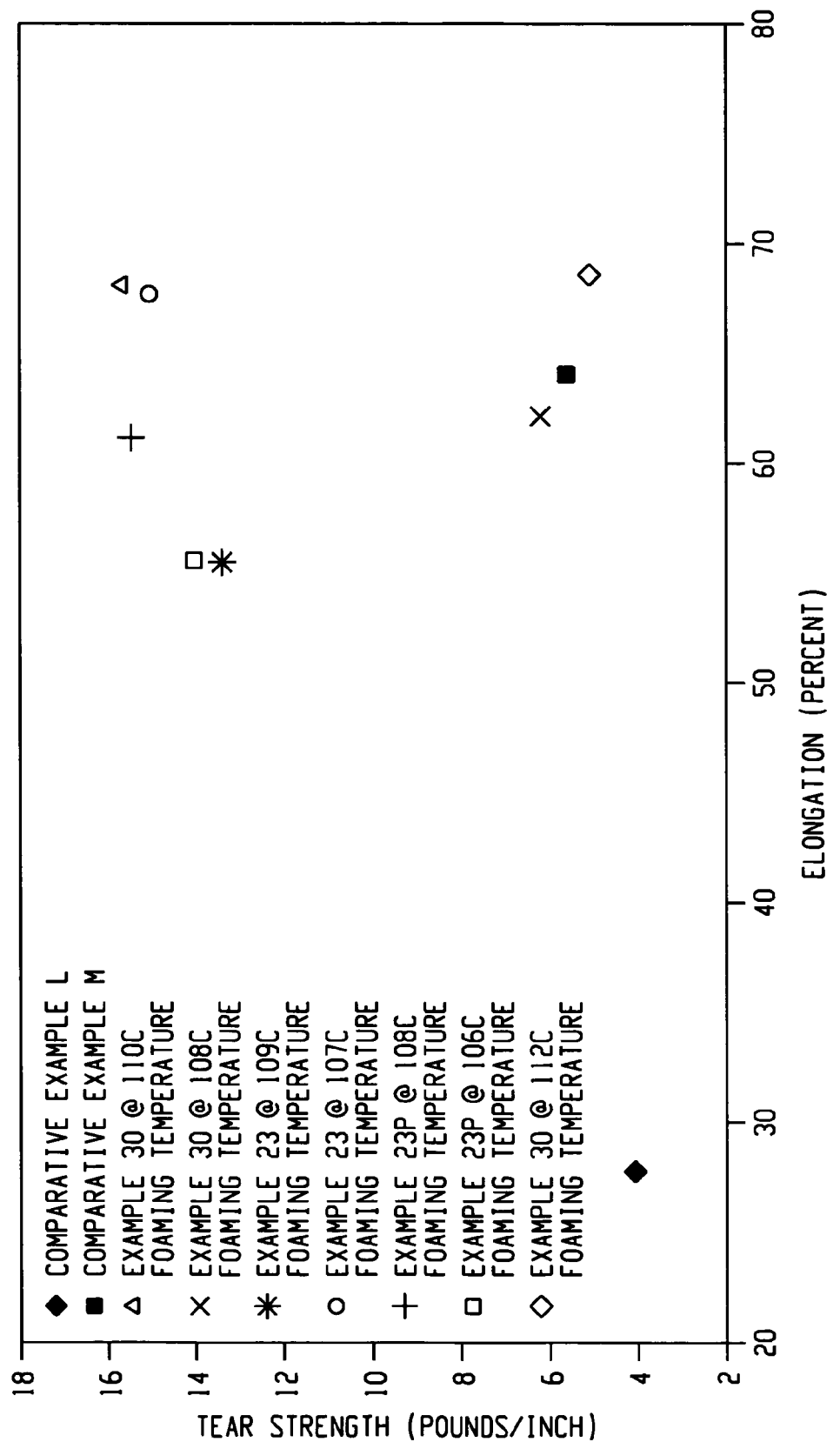
FIG. 15 shows the tear strength results of Example 23 prepared at 107° C. (represented by the open circle) and 109° C. (represented by the "*" symbol) foaming temperatures respectively, Example 23P prepared at 106° C. (represented by the open square) and 108° C. (represented by the "+" symbol) foaming temperatures respectively, Example 30 prepared at 108° C. (represented by the "X" symbol), 110° C. (represented by the open triangle) and 112° C. (represented by the open diamond) foaming temperatures respectively, Comparative Example L (represented by the solid diamond), and Comparative Example N (represented by the solid square). The tear strength was normalized at 2 pounds per cubic foot (ie., 32 kg/m³) density.
Figure 24:
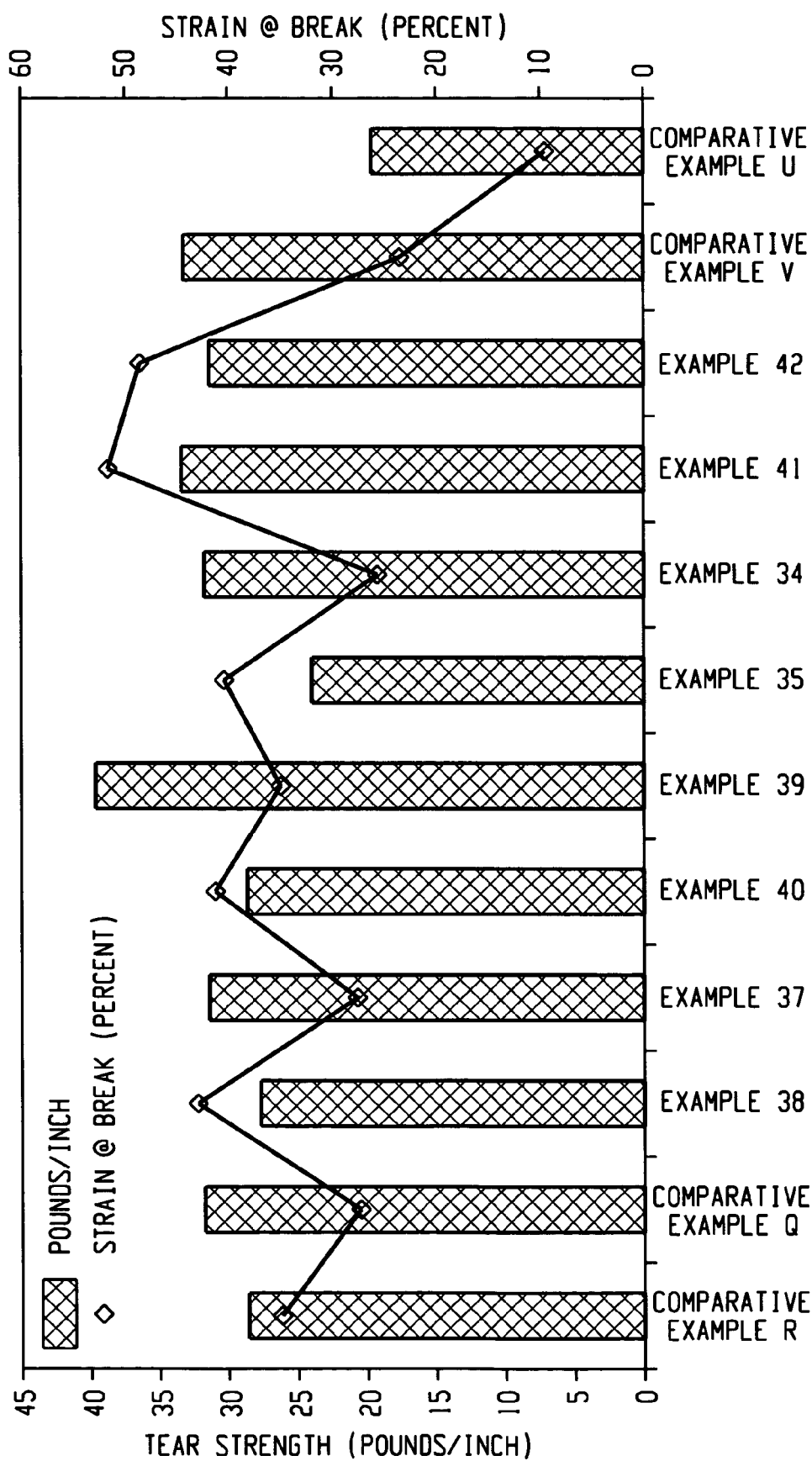
FIG. 24 shows the tear strength and strain at break results of Examples 34-35 and 37-42, and Comparatives Examples Q, R, U and V.

The tear strength and elongation of Examples 23, 23P, 30, 34-35 and 37-42, and Comparative Examples L, M, Q, R, U and V were measured according to ASTM D 624-98 per ASTM D3575 Suffix G, which is incorporated herein by reference. The tear strength and elongation results of the foam examples are shown in FIGS. 15 and 24.

Figure 16:
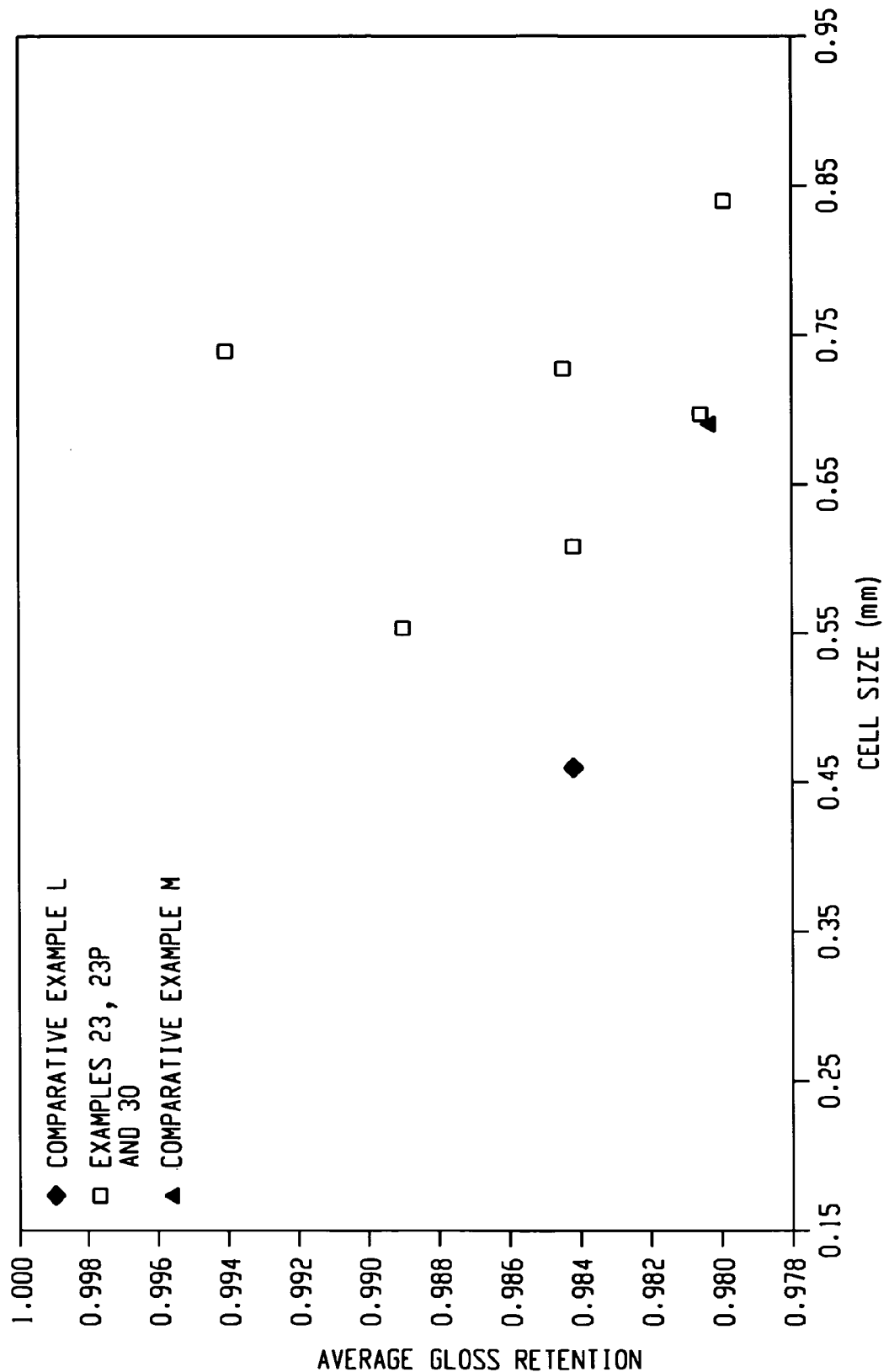
FIG. 16 shows the abrasion performances of Example 23, Example 23P and Example 30 (all represented by the open squares) as well as Comparative Example L (represented by the solid diamond) and Comparative Example M (represented by the solid triangle).
Figure 17:
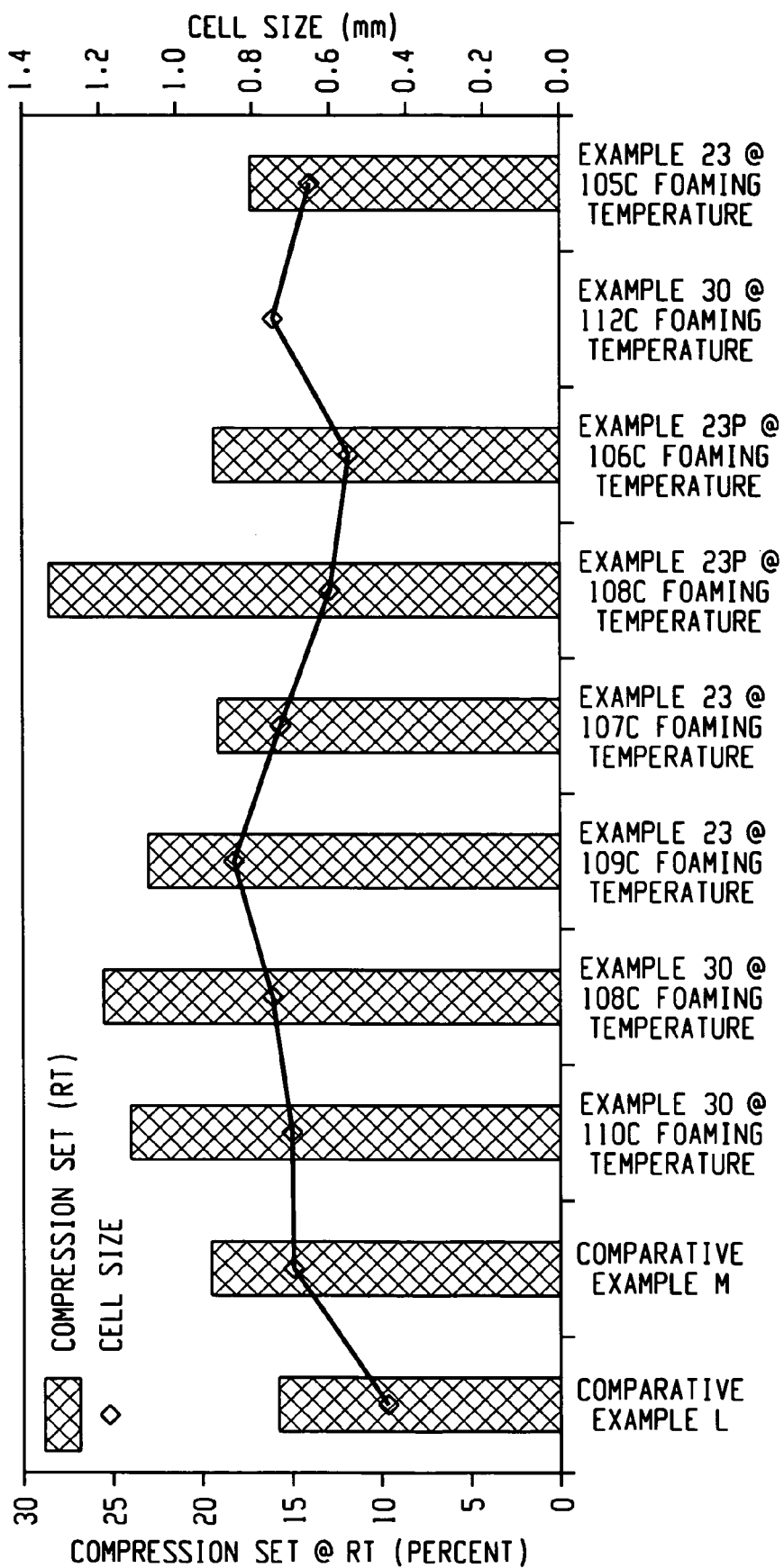
FIG. 17 shows plots of compression set and cell size for Example 23 prepared at 105° C., 107° C. and 109° C. foaming temperatures respectively, Example 23P prepared at 106° C. and 108° C. foaming temperatures respectively, Example 30 prepared at 108° C., 110° C. and 112° C. foaming temperatures respectively, Comparative Example L, and Comparative Example M.
Figure 18:
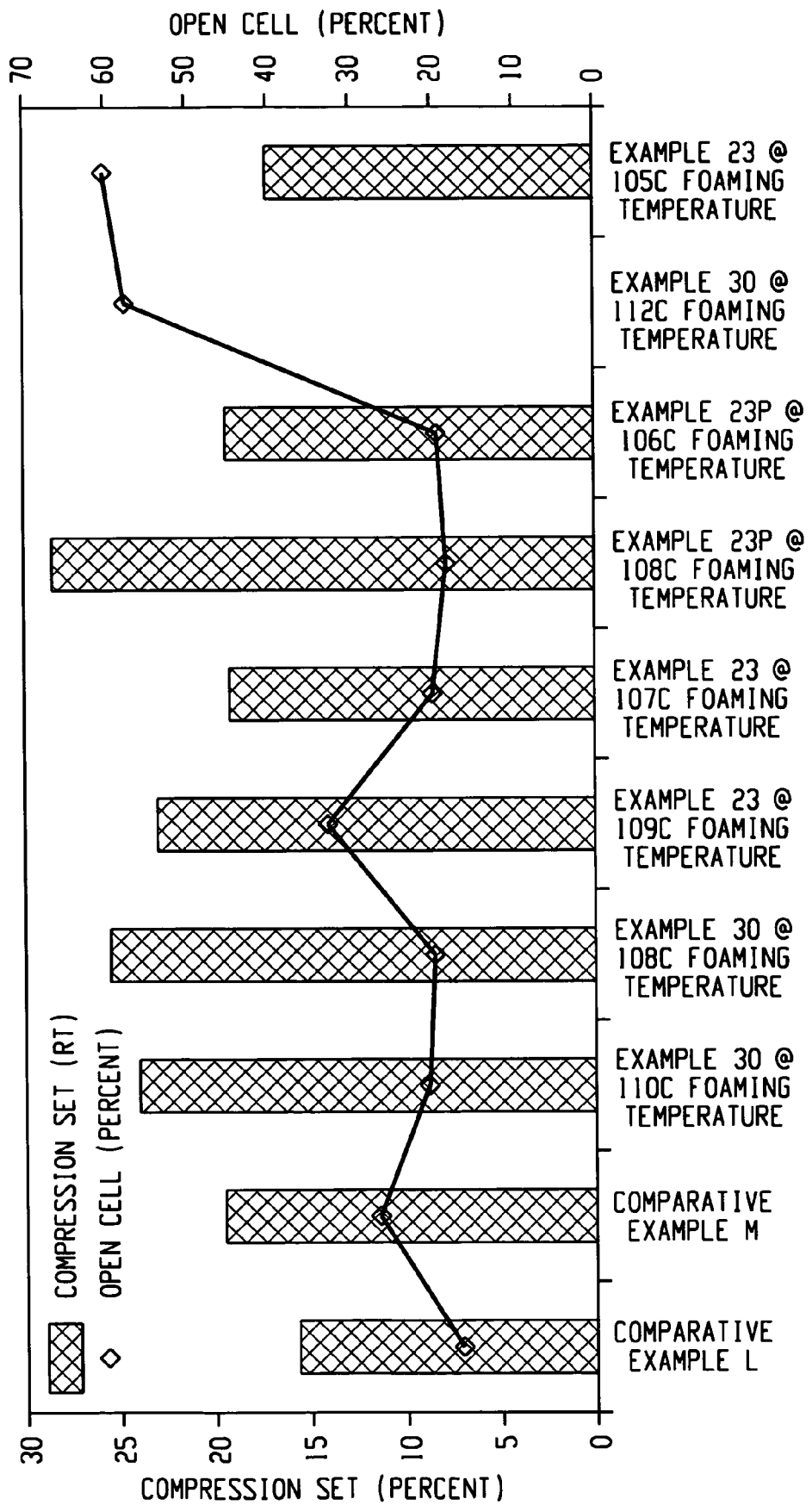
FIG. 18 shows plots of compression set and % of open cell for Example 23 prepared at 105° C., 107° C. and 109° C. foaming temperatures respectively, Example 23P prepared at 106° C. and 108° C. foaming temperatures respectively, Example 30 prepared at 108° C., 110° C. and 112° C. foaming temperatures respectively, Comparative Example L, and Comparative Example M.

The abrasion performances of Examples 23, 23P and 30, and Comparative Examples L and M were measured using a Sutherland rub tester according to ASTM D 5264, which is incorporated herein by reference. The abrasion results of the foam examples are shown in FIG. 16 and Table 12.

The sound absorption of Examples 23 and 30 and Comparative Examples L and M in the frequency range from 1600 to 6400 hz were measured according to ASTM E1050, which is incorporated herein by reference. The sound absorption data of the foam examples are shown in Table 11 and FIG. 19.

TABLE 11

The Sound Absorption Coefficients of Examples 23 and 30 and Comparative Examples L and M and the Parameters and Conditions for the Measurements.

| Measurement | |
|---|---|
| Lines | 800 |
| Span | 6.4 kHz |
| Averages | 100 |
| Zoom | FALSE |
| Centre Frequency (Hz): | 3200 |
| Tube type | Small |
| Generator | |
| Generator Active | TRUE |
| Waveform: | Random |
| Signal Level: | 0.500 Vrms |
| Pink Filter: | Off |
| Environment | |
| Atmospheric Pressure: | 1013.25 hPa |
| Temperature: | 72.00° F. |
| Relative Humidity: | 50.00% |
| Velocity of Sound: | 344.41 m/s |
| Density of Air: | 1.194 kg/m$^3$ |
| Characteristic Impedance of Air: | 411.2 Pa/(m/s) |
| Options | |
| Signal-to-Noise Ratio below: | 10.0 dB |
| Autospectrum (Max-Min) above: | 60.0 dB |
| Calibration Factor exceeds: | 2.0 dB |
| Calibration Factor exceeds: | 2.0 degrees |
| Transfer Function Estimate: | H1 |

TABLE 11-continued

The Sound Absorption Coefficients of Examples 23 and 30 and Comparative Examples L and M and the Parameters and Conditions for the Measurements.

| | Example | | | |
|---|---|---|---|---|
| | 23 | L | M | 30 |
| f (HZ) | Real Part | Real Part | Real Part | Real Part |
| 1632 | 6.66E−02 | 5.46E−02 | 7.01E−02 | 8.14E−02 |
| 1760 | 6.92E−02 | 5.63E−02 | 7.29E−02 | 8.54E−02 |
| 1888 | 7.38E−02 | 5.69E−02 | 7.61E−02 | 9.09E−02 |
| 2008 | 7.76E−02 | 5.87E−02 | 7.93E−02 | 9.67E−02 |
| 2136 | 8.41E−02 | 6.10E−02 | 8.28E−02 | 1.05E−01 |
| 2264 | 9.01E−02 | 6.42E−02 | 8.82E−02 | 1.16E−01 |
| 2392 | 9.89E−02 | 6.82E−02 | 9.32E−02 | 1.28E−01 |
| 2536 | 1.07E−01 | 7.19E−02 | 9.93E−02 | 1.43E−01 |
| 2664 | 1.17E−01 | 7.59E−02 | 1.06E−01 | 1.61E−01 |
| 2792 | 1.28E−01 | 8.02E−02 | 1.14E−01 | 1.83E−01 |
| 2920 | 1.37E−01 | 8.42E−02 | 1.21E−01 | 2.06E−01 |
| 3048 | 1.41E−01 | 8.07E−02 | 1.20E−01 | 2.26E−01 |
| 3176 | 1.51E−01 | 8.14E−02 | 1.24E−01 | 2.57E−01 |
| 3304 | 1.84E−01 | 1.04E−01 | 1.51E−01 | 3.08E−01 |
| 3432 | 2.00E−01 | 1.13E−01 | 1.64E−01 | 3.47E−01 |
| 3560 | 2.25E−01 | 1.27E−01 | 1.82E−01 | 3.93E−01 |
| 3688 | 2.52E−01 | 1.42E−01 | 2.03E−01 | 4.39E−01 |
| 3816 | 2.76E−01 | 1.51E−01 | 2.20E−01 | 4.77E−01 |
| 3944 | 3.09E−01 | 1.67E−01 | 2.47E−01 | 5.12E−01 |
| 4072 | 3.44E−01 | 1.83E−01 | 2.76E−01 | 5.33E−01 |
| 4200 | 3.77E−01 | 1.93E−01 | 3.06E−01 | 5.34E−01 |
| 4328 | 4.12E−01 | 2.08E−01 | 3.45E−01 | 5.21E−01 |
| 4456 | 4.51E−01 | 2.25E−01 | 3.91E−01 | 4.98E−01 |
| 4584 | 4.93E−01 | 2.46E−01 | 4.41E−01 | 4.67E−01 |
| 4704 | 5.33E−01 | 2.67E−01 | 4.83E−01 | 4.34E−01 |
| 4784 | 5.63E−01 | 2.82E−01 | 5.05E−01 | 4.19E−01 |
| 4848 | 5.86E−01 | 2.98E−01 | 5.21E−01 | 4.05E−01 |
| 4976 | 6.22E−01 | 3.28E−01 | 5.33E−01 | 3.78E−01 |
| 5040 | 6.36E−01 | 3.44E−01 | 5.32E−01 | 3.65E−01 |
| 5168 | 6.48E−01 | 3.79E−01 | 5.19E−01 | 3.46E−01 |
| 5232 | 6.40E−01 | 3.89E−01 | 5.06E−01 | 3.33E−01 |
| 5360 | 6.13E−01 | 4.09E−01 | 4.86E−01 | 3.12E−01 |
| 5424 | 5.93E−01 | 4.13E−01 | 4.75E−01 | 2.99E−01 |
| 5488 | 5.70E−01 | 4.18E−01 | 4.67E−01 | 2.91E−01 |
| 5616 | 5.20E−01 | 4.14E−01 | 4.43E−01 | 2.77E−01 |
| 5680 | 4.94E−01 | 4.06E−01 | 4.32E−01 | 2.71E−01 |
| 5744 | 4.71E−01 | 3.97E−01 | 4.17E−01 | 2.65E−01 |
| 5872 | 4.24E−01 | 3.75E−01 | 3.84E−01 | 2.56E−01 |
| 5936 | 4.03E−01 | 3.64E−01 | 3.65E−01 | 2.50E−01 |
| 6000 | 3.84E−01 | 3.51E−01 | 3.47E−01 | 2.45E−01 |
| 6128 | 3.52E−01 | 3.36E−01 | 3.16E−01 | 2.36E−01 |
| 6192 | 3.38E−01 | 3.33E−01 | 3.02E−01 | 2.33E−01 |
| 6256 | 3.24E−01 | 3.29E−01 | 2.89E−01 | 2.28E−01 |
| 6384 | 3.02E−01 | 3.32E−01 | 2.71E−01 | 2.23E−01 |

TABLE 12

The abrasion performances of Examples 23, 23P and 30 and Comparative Examples L and M.

|  | Initial Gloss | | Initial Color | | | Final Gloss | | Final Color | | | Δ Gloss | |
|---|---|---|---|---|---|---|---|---|---|---|---|---|
|  | 20° | 60° | L* | a* | b* | 20° | 60° | L* | a* | b* | 20° | 60° |
| Example L | 84.2 | 89.4 | 23.68 | −0.20 | −0.66 | 79.4 | 88.4 | 23.56 | −0.19 | −0.62 | −2.1 | −0.6 |
|  | 83.4 | 89.0 |  |  |  | 82.4 | 88.8 |  |  |  |  |  |
|  | 82.3 | 89.2 |  |  |  | 81.8 | 88.7 |  |  |  |  |  |
| Example M | 79.0 | 87.6 | 23.67 | −0.20 | −64.00 | 76.2 | 86.4 | 23.69 | −0.23 | −0.64 | −2.0 | −1.2 |
|  | 81.9 | 88.2 |  |  |  | 79.7 | 86.9 |  |  |  |  |  |
|  | 82.6 | 88.9 |  |  |  | 81.5 | 87.7 |  |  |  |  |  |
| Example 23P @ 108 C. | 80.3 | 88.5 | 23.67 | −0.20 | −0.66 | 77.4 | 86.7 | 23.58 | −0.20 | −0.59 | −1.6 | −1.0 |
|  | 82.7 | 88.4 |  |  |  | 80.7 | 87.2 |  |  |  |  |  |
|  | 83.0 | 88.9 |  |  |  | 83.0 | 88.8 |  |  |  |  |  |
| Example 23P @ 106 C. | 80.4 | 88.7 | 23.67 | −0.22 | −0.64 | 76.7 | 86.8 | 23.69 | −0.22 | −0.64 | −1.0 | −0.8 |
|  | 80.4 | 89.1 |  |  |  | 80.8 | 88.7 |  |  |  |  |  |
|  | 82.7 | 89.2 |  |  |  | 82.9 | 89.0 |  |  |  |  |  |
| Example 30 @ 110 C. | 80.0 | 88.1 | 23.68 | −0.25 | −0.62 | 77.1 | 86.6 | 23.47 | −0.19 | −0.57 | −1.7 | −1.6 |
|  | 81.1 | 88.0 |  |  |  | 80.9 | 86.6 |  |  |  |  |  |
|  | 81.7 | 88.3 |  |  |  | 79.8 | 86.4 |  |  |  |  |  |
| Example 30 @ 108 C. | 81.0 | 88.2 | 23.66 | −0.23 | −0.66 | 79.8 | 87.1 | 23.47 | −0.17 | −0.60 | −0.9 | −0.1 |
|  | 83.3 | 87.5 |  |  |  | 82.2 | 87.9 |  |  |  |  |  |
|  | 83.1 | 87.6 |  |  |  | 82.7 | 88.0 |  |  |  |  |  |
| Example 23 @ 109 C. | 80.2 | 87.8 | 23.74 | −0.23 | −0.63 | 77.1 | 85.8 | 23.44 | −16.00 | −0.55 | −2.1 | −1.2 |
|  | 83.0 | 87.4 |  |  |  | 80.5 | 86.3 |  |  |  |  |  |
|  | 82.9 | 87.5 |  |  |  | 82.1 | 86.9 |  |  |  |  |  |
| Example 23 @ 107 C. | 81.2 | 88.1 | 23.68 | −0.23 | −0.65 | 79.7 | 86.9 | 23.46 | −0.19 | −0.56 | −1.9 | −0.7 |
|  | 83.9 | 87.9 |  |  |  | 80.2 | 86.9 |  |  |  |  |  |
|  | 82.5 | 87.3 |  |  |  | 82.1 | 87.3 |  |  |  |  |  |

|  | Δ Color | | | Color Change | 20 Gloss Change | 60 Gloss Change | Av Gloss Retention | Cell size mm |
|---|---|---|---|---|---|---|---|---|
|  | L | a | b |  |  |  |  |  |
| Example L | −0.12 | 0.01 | 0.04 | 0.1269 | 0.9748 | 0.9936 | 0.9842 | 0.46 |
| Example M | 0.02 | −0.03 | 63.36 | 63.3600 | 0.9749 | 0.9860 | 0.9805 | 0.69 |
| Example 23P @ 108 C. | −0.09 | 0.00 | 0.07 | 0.1140 | 0.9801 | 0.9883 | 0.9842 | 0.61 |
| Example 23P @ 106 C. | 0.02 | 0.00 | 0.00 | 0.0200 | 0.9873 | 0.9906 | 0.9890 | 0.56 |
| Example 30 @ 110 C. | −0.21 | 0.06 | 0.05 | 0.2241 | 0.9794 | 0.9818 | 0.9806 | 0.7 |
| Example 30 @ 108 C. | −0.19 | 0.06 | 0.06 | 0.2081 | 0.9891 | 0.9989 | 0.9940 | 0.74 |
| Example 23 @ 109 C. | −0.30 | −15.77 | 0.08 | 15.7731 | 0.9740 | 0.9859 | 0.9800 | 0.84 |
| Example 23 @ 107 C. | −0.22 | 0.04 | 0.09 | 0.2410 | 0.9774 | 0.9916 | 0.9845 | 0.73 |

TABLE 13

The foam densities and percentages of open cell of Examples 20, 23, 23P, 30 and 31 and Comparative Examples L and N at foaming temperatures range of 103-112° C.

|  | Example L | | Example N | | Example 20 | | Example 30 | | Example 31 | | Example 23 | | Example 23P | |
|---|---|---|---|---|---|---|---|---|---|---|---|---|---|---|
| Temp, C. | density (pcf) | open cell (%) | density (pcf) | open cell (%) | density (pcf) | open cell (%) | density (pcf) | open cell (%) | density (pcf) | open cell (%) | density (pcf) | open cell (%) | density (pcf) | open cell (%) |
| 112 |  |  |  |  |  |  | 1.78 | 20 |  |  |  |  | preblend | |
| 111 |  |  |  |  |  |  | 1.87 | 21.4 | 1.96 | 45.7 |  |  |  |  |
| 110 | 2.4 | 32 |  |  |  |  | 1.8 | 20.5 | 1.89 | 45.7 | 2.17 | 39 | 1.72 | 26.5 |
| 109 |  |  |  |  |  | 57.3 | 1.85 | 9 | 1.91 | 49.2 | 1.89 | 32.9 | 1.75 | 22.5 |
| 108 | 2.1 | 21 | 1.99 | 83.2 | 2.18 | 37.5 | 1.84 | 19.9 | 1.97 | 56.2 | 1.99 | 24.1 | 1.82 | 18.2 |
| 107 | 2.05 | 12 |  |  | 2.22 | 37.9 |  |  | 1.99 | 64.4 | 1.81 | 20 | 1.87 | 17.5 |
| 106 | 2.1 | 18 | 2.12 | 24.1 | 2.5 | 30.7 |  |  | 2.18 | 82.1 | 1.97 | 16.7 | 2 | 19.3 |
| 105 | 2.2 | 17 | 2.05 | 20.5 | 2.63 | 30.7 |  |  |  |  | 1.84 | 60.9 | 2.04 | 20.4 |
| 104 | 2.2 | 23 | 1.91 | 13.1 | 2.66 | 37.2 |  |  |  |  |  |  |  |  |
| 103 | 2.3 | 25 | 1.95 | 12 | 2.2 |  |  |  |  |  |  |  |  |  |

Figure 19:
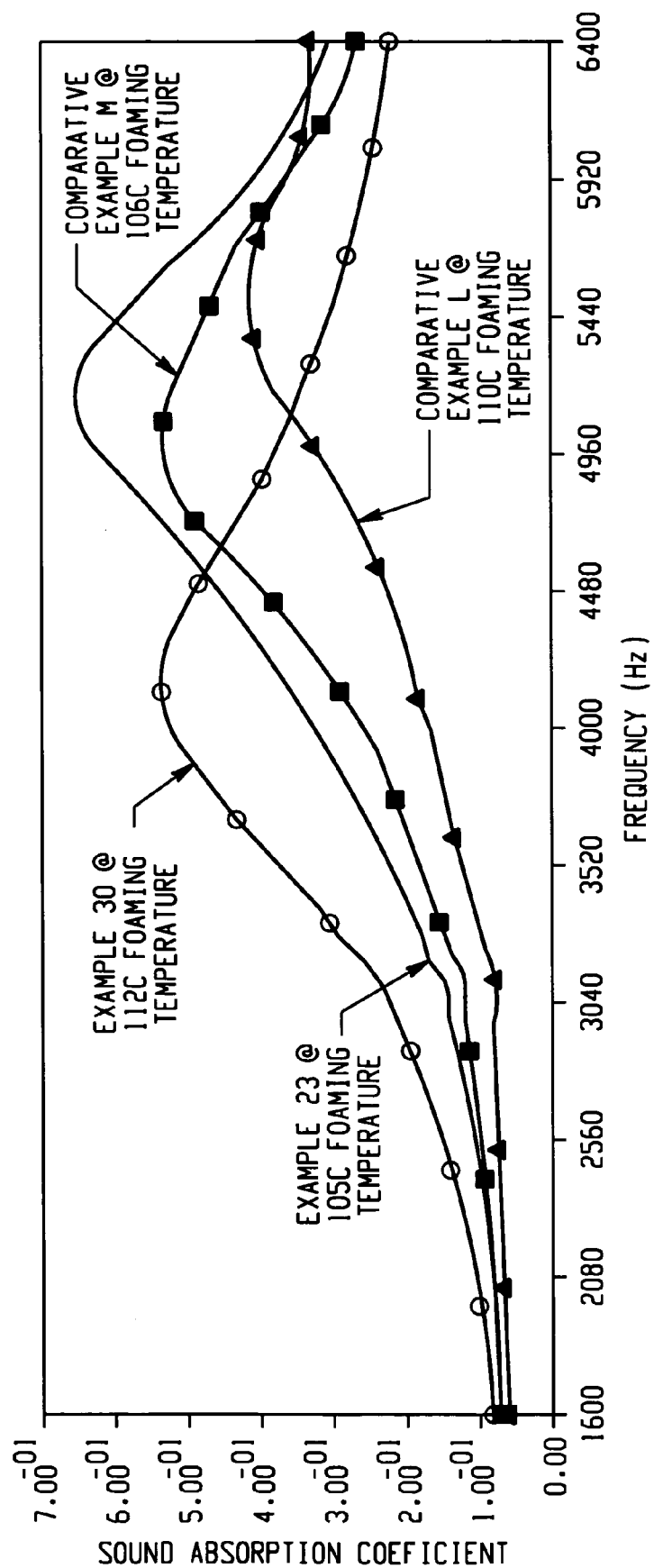
FIG. 19 shows the sound absorption performances of Example 23 prepared at 105° C. foaming temperature (represented by the open diamonds), Example 30 prepared at 112° C. foaming temperature (represented by the open circles), Comparative Example L (represented by the solid triangles), and Comparative Example M (represented by the solid squares).

FIG. 19 indicates that Examples 23 and 30 have equal or higher sound absorption coefficients that those of Comparative Examples M and L. In general, Examples 23, 23P, 30, 34-35 and 37-42 show higher linear changes than Comparative Examples L, M, Q, R, U and V in the compression creep test (see FIGS. 12 and 20), whereas the compressive strengths of Examples 23, 23P and 30 are about the same as those of Comparative Examples L and M (See FIG. 13). Further, FIG. 16 indicates that the average gloss retentions of Example 23, Example 23P and Example 30 are generally higher than those of Comparative Examples L and M in the abrasion test.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A soft foam comprising at least one ethylene/α-olefin interpolymer, wherein the density of the soft foam is from about 10 to 150 kg/m³ and wherein the ethylene/α-olefin interpolymer is a block interpolymer and:

(a) has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$T_m \geq -2002.9 + 4538.5(d) - 2422.2(d)^2$; or (b) has a $M_w/M_n$ from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$ΔT > -0.1299(ΔH) + 62.81$ for ΔH greater than zero and up to 130 J/g, $ΔT \geq -48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), wherein the ratio of G'(25° C.) to G'(100° C.) is in the range of about 1:1 to about 9:1.

2. The soft foam of claim 1, wherein the ethylene/α-olefin interpolymer has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$T_m \geq 858.91 - 1825.3(d) + 1112.8(d)^2$.

3. The soft foam of claim 1, wherein the ethylene/α-olefin interpolymer has a $M_w/M_n$ from about 1.7 to about 3.5 and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$ΔT > -0.1299(ΔH) + 62.81$ for ΔH greater than zero and up to 130 J/g, $ΔT \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.

4. The soft foam of claim 1, wherein the ethylene/α-olefin interpolymer is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$.

5. The soft foam of claim 1, wherein the numerical values of Re and d satisfy the following relationship:

$Re > 1491 - 1629(d)$.

6. The soft foam of claim 1, wherein the numerical values of Re and d satisfy the following relationship:

$Re > 1501 - 1629(d)$.

7. The soft foam of claim 1, wherein the numerical values of Re and d satisfy the following relationship:

$Re > 1511 - 1629(d)$.

8. The soft foam of claim 1, wherein the ethylene/α-olefin interpolymer has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer.

9. The soft foam of claim 1, wherein the ethylene/α-olefin interpolymer has a storage modulus at 25° C., G'(25° C.), and a storage modulus at 100° C., G'(100° C.), wherein the ratio of G'(25° C.) to G'(100° C.) is in the range of about 1:1 to about 9:1.

10. The soft foam of claim 1, wherein the α-olefin in the ethylene/α-olefin interpolymer is styrene, propylene, 1-butene, 1-hexene, 1-octene, 4-methyl-1-pentene, norbornene, 1-decene, 1,5-hexadiene, or a combination thereof.

11. The soft foam of claim 1, wherein the soft foam contains less than 5 wt. % of gel per ASTM D-2765-84 Method A.

12. The soft foam of claim 1 further comprising a polyolefin.

13. The soft foam of claim 12, the polyolefin is a low density polyethylene, a high-melt-strength polypropylene or a combination thereof.

14. The soft foam of claim 12, wherein the ratio of the polyolefin to the ethylene/α-olefin interpolymer is from about 1:10 to about 10:1 by weight.

15. The soft foam of claim 1 further comprising at least an additive, wherein the additive is a grafting initiator, cross-linking catalyst, blowing agent activator, coagent, plasticizer, colorant or pigment, stability control agent, nucleating agent, filler, antioxidant, acid scavenger, ultraviolet stabilizer, flame retardant, lubricant, processing aid, extrusion aid or a combination thereof.

16. A soft foam comprising at least one ethylene/α-olefin interpolymer, wherein the density of the soft foam is from about 10 to 150 kg/m$^3$ and wherein the ethylene/α-olefin interpolymer is a block interpolymer and has:
(a) at least one molecular fraction which elutes between 40° C. and 130° C. when fractionated using TREF, characterized in that the fraction has a block index of at least 0.5 and up to about 1 and a molecular weight distribution, $M_w/M_n$, greater than about 1.3; or
(b) an average block index greater than zero and up to about 1.0 and a molecular weight distribution, $M_w/M_n$ greater than about 1.3.

17. The soft foam of claim 16, wherein the ethylene/α-olefin interpolymer has at least one molecular fraction which elutes between 40° C. and 130° C. when fractionated using TREF, characterized in that the fraction has a block index of at least 0.5 and up to about 1 and a molecular weight distribution, $M_w/M_n$, greater than about 1.3.

18. The soft foam of claim 16, wherein the ethylene/α-olefin interpolymer has an average block index greater than zero and up to about 1.0 and a molecular weight distribution, $M_w/M_n$, greater than about 1.3.

19. The soft foam of claim 16, wherein the α-olefin the ethylene/α-olefin interpolymer is styrene, propylene, 1-butene, 1-hexene, 1-octene, 4-methyl-1-pentene, norbornene, 1-decene, 1,5-hexadiene, or a combination thereof.

20. The soft foam of claim 16, wherein the soft foam contains less than 5 wt.% of gel per ASTM D-2765-84 Method A.

21. The soft foam of claim 16 further comprising a polyolefin.

22. The soft foam of claim 21, the polyolefin is a low density polyethylene, a high-melt-strength polypropylene or a combination thereof.

23. The soft foam of claim 21, wherein the ratio of the polyolefin to the ethylene/α-olefin interpolymer is from about 1:10 to about 10:1 by weight.

24. The soft foam of claim 16 further comprising at least an additive, wherein the additive is a grafting initiator, cross-linking catalyst, blowing agent activator, coagent, plasticizer, colorant or pigment, stability control agent, nucleating agent, filler, antioxidant, acid scavenger, ultraviolet stabilizer, flame retardant, lubricant, processing aid, extrusion aid or a combination thereof.

25. A foamable composition comprising:
(i) a blowing agent; and
(ii) at least one ethylene/α-olefin interpolymer, wherein the ethylene/α-olefin interpolymer is a block interpolymer and:
(a) has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$$T_m \geq -2002.9 + 4538.5(d) - 2422.2(d)^2; \text{ or}$$

(b) has a $M_w/M_n$ from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to } 130 \text{ J/g,}$$

$$\Delta T \geq 48° \text{ C. for } \Delta H \text{ greater than } 130 \text{ J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), wherein the ratio of G'(25° C.) to G'(100° C.) is in the range of about 1:1 to about 9:1.

26. The foamable composition of claim 25, wherein the blowing agent is isobutane.

27. The foamable composition of claim 25 further comprising at least an additive, wherein the additive is a grafting initiator, cross-linking catalyst, blowing agent activator, coagent, plasticizer, colorant or pigment, stability control agent, nucleating agent, filler, antioxidant, acid scavenger, ultraviolet stabilizer, flame retardant, lubricant, processing aid, extrusion aid or a combination thereof.

28. The foamable composition of claim 25 further comprising a polyolefin.

29. The foamable composition of claim 28, wherein the polyolefin is a low density polyethylene, a high-melt-strength polypropylene or a combination thereof.

30. A foamable composition comprising:
(i) a blowing agent; and
(ii) at least one ethylene/α-olefin interpolymer, wherein the ethylene/α-olefin interpolymer is a block interpolymer and has:
  (a) at least one molecular fraction which elutes between 40° C. and 130° C. when fractionated using TREF, characterized in that the fraction has a block index of at least 0.5 and up to about 1 and a molecular weight distribution, $M_w/M_n$, greater than about 1.3; or
  (b) an average block index greater than zero and up to about 1.0 and a molecular weight distribution, $M_w/M_n$, greater than about 1.3.

31. The foamable composition of claim 30, wherein the blowing agent is isobutane.

32. The foamable composition of claim 30 further comprising at least an additive, wherein the additive is a grafting initiator, cross-linking catalyst, blowing agent activator, coagent, plasticizer, colorant or pigment, stability control agent, nucleating agent, filler, antioxidant, acid scavenger, ultraviolet stabilizer, flame retardant, lubricant, processing aid, extrusion aid or a combination thereof.

33. The foamable composition of claim 30 further comprising a polyolefin.

34. The foamable composition of claim 33, wherein the polyolefin is a low density polyethylene, a high-melt-strength polypropylene or a combination thereof.

35. A foam article comprising the soft foam of claim 1.

36. The foam article of claim 35, wherein the foam article is suitable for acoustical insulation, vibration control, cushioning, specialty packaging, automotive soft touch, thermal insulation or impact absorption.

37. A foam article comprising the soft foam of claim 16.

38. The foam article of claim 37, wherein the foam article is suitable for acoustical insulation, vibration control, cushioning, specialty packaging, automotive soft touch, thermal insulation or impact absorption.

* * * * *